United States Patent [19]
Canada et al.

[11] Patent Number: 5,870,699
[45] Date of Patent: *Feb. 9, 1999

[54] HAND HELD DATA COLLECTOR AND ANALYZER SYSTEM

[75] Inventors: Ronald G. Canada; Danny Simpson; Zbigniew Czyzewski; Thomas E. Nelson, all of Knoxville, Tenn.

[73] Assignee: CSI Technology, Inc., Wilmington, Del.

[ * ] Notice: The term of this patent shall not extend beyond the expiration date of Pat. No. 5,633,811.

[21] Appl. No.: 810,132

[22] Filed: Feb. 25, 1997

Related U.S. Application Data

[63] Continuation of Ser. No. 355,208, Dec. 9, 1994, Pat. No. 5,633,811.

[51] Int. Cl.⁶ .............................. G01M 7/00; G01M 7/02
[52] U.S. Cl. ......................... 702/190; 702/189; 702/113; 702/187
[58] Field of Search .......................... 364/576, 484–487, 364/508, 572, 574; 324/76.19, 76.21, 76.28; 702/190, 189, 113, 141, 179, 187, 182

[56] References Cited

U.S. PATENT DOCUMENTS

| | | | |
|---|---|---|---|
| 4,520,674 | 6/1985 | Canada et al. | |
| 4,862,407 | 8/1989 | Fette et al. | |
| 4,885,707 | 12/1989 | Nichol et al. | |
| 4,929,874 | 5/1990 | Mizuno et al. | |
| 5,068,799 | 11/1991 | Jarrett, Jr. | 364/507 |
| 5,233,546 | 8/1993 | Witte | 364/602 |
| 5,255,565 | 10/1993 | Judd et al. | |
| 5,317,524 | 5/1994 | Das et al. | 364/557 |
| 5,453,744 | 9/1995 | VanDeusen et al. | 341/155 |
| 5,544,073 | 8/1996 | Piety et al. | 364/508 |
| 5,633,811 | 5/1997 | Canada et al. | 364/576 |

OTHER PUBLICATIONS

1. Affidavit of John McGlone including Exhibits A, B, and C dated Sep. 3, 1998.
2. A brochure for the CSI 2115 dated Jul. 29, 1992.

Excerpts from Revision 1.0 of the PL302 Machine Analyser Operating Manual (Analyser Mode), including the pages from the Operator Reference Section with instructions regarding CENTRE, CH1, SOURCE, SPAN and ZOOM.

Excerpts from the book, *Frequency Analysis* by R.B. Randall of Bruel and Kjaer (3rd edition 1st print) revision Sep, 1987 which includes title Page, foreword, table of contents and section 4.4 (pp. 165–172). Lawyers for Entek IRD International Corporation have said that someone from Diagnostic Instruments informed them that the zoom processing in the PL 302 is done in the manner described in the aforementioned frequency analysis book.

Correspondence describing the Diagnostic Instruments PL302.

Excerpts from Hewlett Packard's 1991 Test and Measurement Catalog including pp. 152–155, introducing their signal analyzer line and p. 156 showing HP's Model No. 3560A.

1990 and 1993 literature of TEC and Entek, respectively for TEC Smart Meter Plus Data Collector.

(List continued on next page.)

*Primary Examiner*—John Barlow
*Assistant Examiner*—Patrick Assouad
*Attorney, Agent, or Firm*—Luedeka, Neely & Graham, PC

[57] ABSTRACT

A hand held data collector and analyzer achieves superior stability, accuracy and reliability through the use of a fixed frequency anti-aliasing filter and two analog to digital converters, one for high frequency signals and one for low frequency signals. Efficient digital filtering and decimation is achieved by providing specialized hardware filters and decimators and implementing software filters and decimators in a data processor. A true zoom method is employed to take advantage of the filtering and decimation capabilities, and independent digital signal processors operate serially on incoming signals to further reduce demands on the central processing unit. In addition, the RAM system memory is formatted as a pseudo-card to facilitate use of a PCMCIA memory card or the RAM system memory.

23 Claims, 6 Drawing Sheets

OTHER PUBLICATIONS

Excerpts from ENTEK's 1993 manual (2nd edition) for its "Quick Load" software, describing the use of Quick Load with Bruel and Kjaer Model 2526 Data Collectors, including pp. 2–2, 2–3, 3–16, and 3–17 describing the zoom functions of the B&K 2526.

Product info literature for the B&K type 2526 Data Collector.

Product literature dated 1989 for Palomar Technology International SD MICROLOG Data Collector.

A brochure for the CSI 2115.

First brochure for the Data–Trap instrument, manufactured by Beta Monitors & Controls, ~1982.

Second brochure for the Data–Trap instrument, manufactured by Beta Monitors & Controls, ~1982.

Letter from R.L. Jenkins to Bryan Long of Beta Monitors & Controls, discussing the Data–Trap instrument, 20 Oct. 1982.

DSP–Motorola Digital Signal Processors: Principles of Sigma–Delta Modulation for Analog–to–Digital Converters, by Sangil Park, Ph.D., Strategic Applications, Digital Signal Processor Operation, Phoenix Arizona (Apr. 1993).

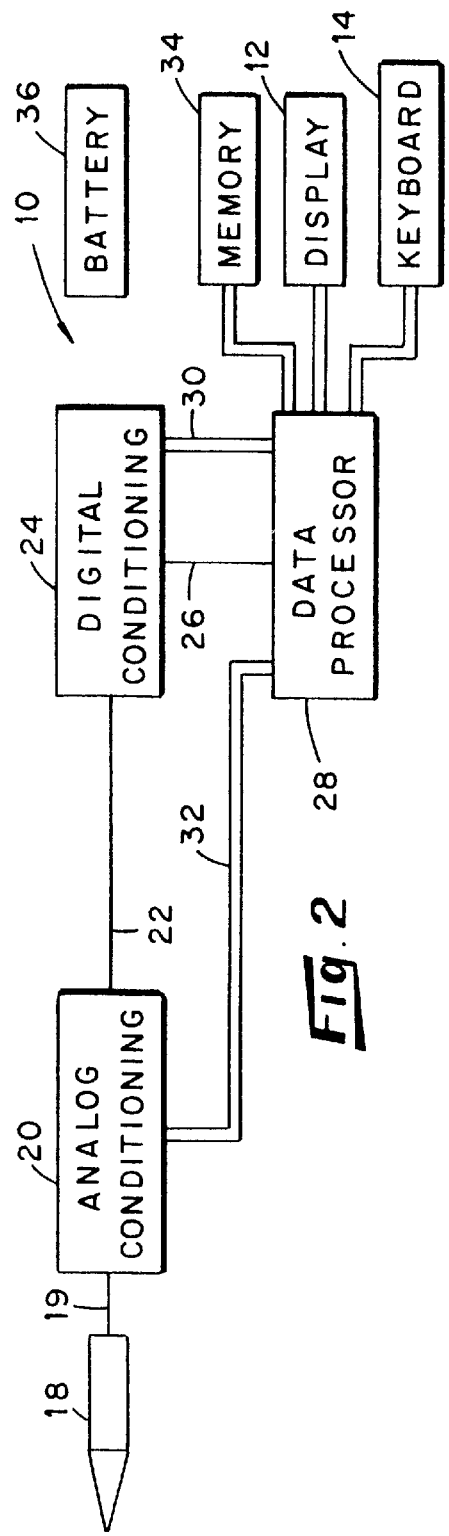
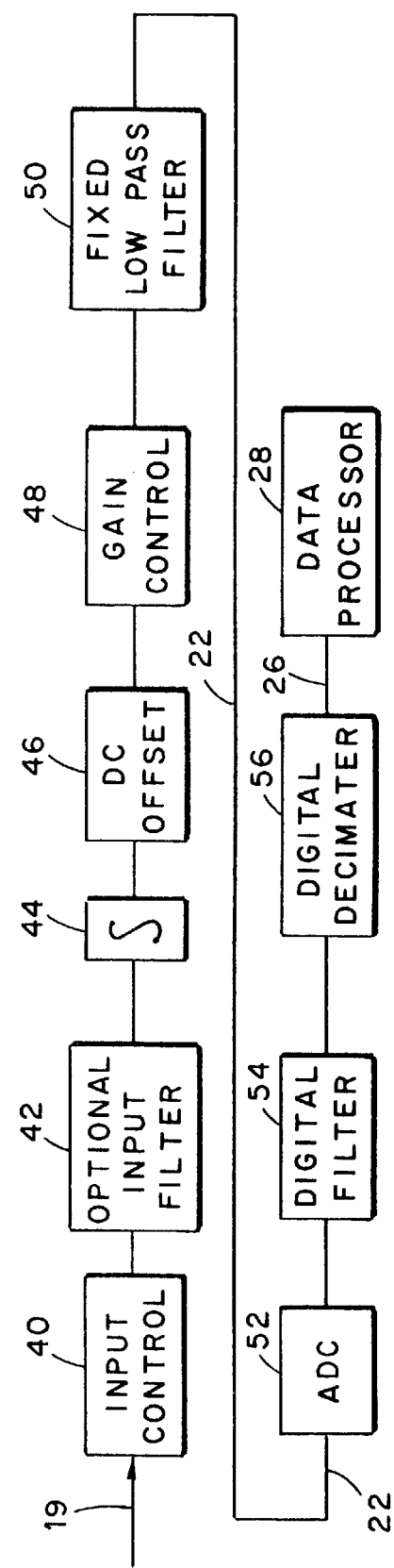
Fig. 2
Fig. 3

HAND HELD DATA COLLECTOR AND ANALYZER SYSTEM

This application is a continuation of application Ser. No. 08/355,208, now U.S. Pat. No. 5,633,811 filed Dec. 9, 1994.

FIELD OF INVENTION

The present invention relates to hand held data collector and analyzer systems and particularly relates to a vibration data collector and analyzer system having improved frequency analysis.

BACKGROUND AND SUMMARY OF INVENTION

Hand held data collector and analyzer systems are typically used to collect vibration data from machines for use in predicting maintenance requirements. For example, a typical data collector and analyzer instrument may be programmed to receive a route from a host computer, and such route would include a list of machines, test points, and a set-up condition for each test point. There may be thirty machines in the route with ten test points on each machine, and for each test point there may be specified a frequency range to be analyzed, a type of analysis to be performed, a particular type or set of data to be stored, and similar other parameters. In response to commands from the user, the hand held instrument prompts the user as to the identity of the machine and the test point to be monitored, and it automatically sets up the instrument, for example, to accept the specified frequency range for the test point, perform the specified analysis and store the specified type or set of data. A Fast Fourier Transform analysis may be performed on a preselected frequency range of the data and all or part of the resulting frequency spectrum may be stored and displayed. As the user progresses through the thirty machines and the corresponding 300 test points, he collects and stores vibration data which is subsequently transferred to the host computer for long term storage and further analysis.

Such hand held instruments are subject to rather severe weight and size constraints imposed by the need to be hand held and also must operate in a very hostile environment, such as a power plant or a heavy industrial manufacturing facility. In this environment, the instruments are exposed to a wide variety of vibration as well as a wide variety of temperatures, pressures, gas, dust and other atmospheric conditions. In such environment, the hand held instruments must be able to monitor vibration accurately in the presence of extreme noise. For example, one may wish to monitor a particular test point for a possible crack in a shaft bearing, where the bearing is rotating at 200 hertz, or 12,000 RPM, for example, and the bearing has twenty ball bearings. A crack in such bearing would produce a relatively high frequency, low amplitude, vibration or click each time a ball bearing passed over the crack. If such bearing is located in a typical factory, it will be operating in the presence of noise vibration from many sources such as stamps, presses, roller mills, conveyors, pumps, motors, etc.

Thus, to distinguish a click associated with a crack in a bearing, careful analysis of the frequency content of the monitor vibration signal is performed. Preferably, a user would select a frequency range of interest and look for a specific frequency that indicates or may indicate a cracked bearing. Typical known data collector and analyzer systems use analog filters to remove some of the unwanted frequency components. Usually a frequency spectrum is generated in a specific range and then specific data from the spectrum is inspected, compared or just stored.

One approach to providing the frequency analysis capability has been to provide a variable low-pass analog filter whose cutoff frequency can be controlled, and the output of the filter is sampled to provide a digital signal that is operated on by a computer to produce a frequency spectrum. This approach is generally acceptable, but it is not without limitations.

For example, analog low-pass filters will produce a certain amount of distortion of amplitude, frequency and phase, and variable low-pass filters tend to have greater distortion than fixed low-pass filters, particularly at or around the upper cutoff frequency of the filter. Such distortion is acceptable for many applications, but it certainly is not a desirable characteristic. In certain sensitive applications, such distortion may disqualify an instrument.

In addition to limitations at the higher end of the frequency range, some prior art instruments are known to be inaccurate and even unstable at low frequencies, particularly at frequencies on the order of one hertz or less. This characteristic usually results from circuit designs focused on higher frequencies because such frequencies are generally of greater interest. Again, however, in some applications accurate monitoring of low frequency signals is critical.

Another frequency related problem is the manner in which hand held data collector and analyzer instruments produce output that is limited to a frequency band of interest. One approach might be to use variable filters, such as switched capacitor filters, for which both a low-pass and a high-pass cutoff may be specified, or banks of filters may be used. Generally, this approach is not practical for a hand held device.

Another approach has been to provide a variable low-pass filter whose output is converted to a digital signal, and a Fast Fourier Transform is performed on the digital signal to produce a spectrum. Then, only the frequency band of interest in the spectrum is displayed or stored. This technique can be wasteful in terms of time, processor demands and accuracy. For example, to provide a 100 line spectrum between 9 kilohertz and 10 kilohertz, such an approach calculates a 1,000 line spectrum between 0 and 10 kilohertz, essentially discards the lower 900 lines, and displays the upper 100 lines. The discarded 900 lines represent waste.

These and other problems are addressed by the present invention which uses a fixed filter design to overcome the problems associated with variable filter designs. The computer source code for the present invention is listed in its entirety in the appendix. In accordance with the present invention, a hand held vibration data collector and analyzer system includes a vibration transducer producing an analog vibration signal. An input signal conditioning circuit receives and conditions the analog vibration signal from the vibration transducer to produce a conditioned analog signal, and it also includes a fixed frequency low-pass, or anti-aliasing, filter having an upper cutoff frequency set at a desired frequency for producing the conditioned analog signal with a desired frequency range. The input signal conditioning circuit further includes amplifiers for producing the conditioned analog signal at a desired amplitude, a D.C. offset circuit for removing D.C. components from the analog signal and an analog to digital converter for receiving and sampling the conditioned analog signal to produce a digital signal which is transmitted to a data processor for producing desired digital data.

The processor includes a transformer for selectively operating on the digital signal, such as performing a Fast Fourier Transform, and producing a frequency spectrum from the digital signal. The data processor also includes a selector for selecting and producing select data for storage from the digital signal or the frequency spectrum. A keyboard is interfaced with the data processor for inputting commands and data, and a display is interfaced with the data processor for displaying information. A memory, interfaced with the data processor, stores information including the select data and means are provided for transferring information stored in the memory to another computer.

One advantage of the system described above is that the fixed filter does not produce the same amount of distortion that is normally associated with variable low-pass filters, especially in the vicinity of the upper cutoff frequency of the filters. In addition, a selected frequency range of interest will normally be distant from the cutoff frequency of the fixed frequency low-pass filter, which is not the case in designs using variable frequency low-pass filters, as discussed above. Thus, with the design in the present invention, the distortion in the vicinity of the cutoff frequency of the fixed frequency low-pass filter will normally not have an impact on the operation of the instrument.

In a preferred embodiment, the input conditioning circuit includes hardware for receiving and sampling the conditioned analog signal at a sample frequency that is substantially greater than the maximum frequency of interest to produce a digital signal and further, for digitally low-pass filtering and digitally decimating the digital signal to produce the digital signal having a reduced sample rate and a selected upper cutoff frequency. In this embodiment, the data processor also includes a digital filter and decimator for optionally and selectively reducing the sample rate and frequency content of the digital signal to produce a modified digital signal. Thus, in this particular embodiment, two separate portions of the system are designed to perform digital low-pass filtering and digital decimation.

In general, hardware performing digital filtering and decimation is fast and precise, but generally, the variability of the output sample rates is limited. Digital low-pass filtering and decimation in the data processor is typically slower, but one may precisely choose the output sample rate and even the level of precision desired. By dividing the duty of digital filtering and decimation between hardware in the input signal conditioning circuit and the data processor, one may minimize the demands on the data processor without sacrificing precision, speed or variability. Also, by dividing this digital function between two portions of the system, one may efficiently impose other operations between the two digital filtering and decimation operations, again, without placing an undue or unrealistic demand on the data processor.

For example, in a preferred embodiment so-called true zoom processing is facilitated by the two digital filtering and decimation operations. In this embodiment, the data processor again includes a digital filter and decimator as described above. The data processor further includes a zoom processor for selectively and optionally operating on the digital signal from the conditioning circuit. To begin the zoom processing, the hardware of the conditioning circuit is actuated to digitally filter and decimate the input digital signal to produce a digital signal at a sample rate and with a frequency content as low as possible, but still greater than an upper frequency, which is the maximum frequency of interest in a frequency band of interest. The zoom processor operates on the digital signal by frequency shifting the digital signal and at least low-pass filtering the frequency shifted digital signal to produce a zoom digital signal. The zoom digital signal is a selected band of frequencies in the digital signal ranging from a selected upper frequency, the maximum frequency of interest, to a selected lower frequency, and having a center frequency. Preferably, the zoom processor multiplies the digital signal by a function equal to $e^{2\pi i(F0)/(Fs)}$, where F0 equals the center frequency of the selected band and Fs equals the sample rate of the digital signal.

This multiplication will effect a frequency shift of the digital signal such that the center frequency is shifted to zero. Then, preferably, the frequency shifted signal is subjected to low-pass filtering where the upper cutoff frequency of the low-pass filter is equal to: $(f_u-f_b)/2$ where $f_u$=the upper frequency and $f_b$=the bottom or lower frequency in the frequency band of interest. A Fast Fourier Transform operation is performed on the low-pass filtered, decimated, and frequency shifted signal to produce a frequency spectrum that is then shifted up by $f_b$, the lower frequency, to become a frequency spectrum from $f_b$ to $f_u$. By shifting the frequency of the digital signal down before performing the filtering and transform operations, the speed and efficiency of the zoom processing is dramatically increased without any loss of accuracy.

To accommodate and process high frequency signals produced by the preferred embodiment of the present invention, the digital signal processor includes a digital signal processor (DSP) connected serially to receive the digital signal from the conditioning circuit for operating on the digital signal and, at least, for independently performing Fast Fourier Transforms to produce a frequency spectrum from the digital signal. The data processor further includes a central processing unit for controlling the operation of the system, including the operation of the DSP. In addition, a direct memory access (DMA) is provided in the CPU for transferring data directly to memory from the DSP to memory without interrupting the CPU.

In an alternate embodiment, the system includes a main conditioning circuit and an optional conditioning circuit, both of which include fixed frequency anti-aliasing filters, amplifiers and analog to digital converters. The main conditioning circuit includes a main microprocessor controller for controlling the main conditioning circuit, including the main analog to digital converter. The optional conditioning circuit does not include a separate microprocessor controller. Instead, control over the optional conditioning circuit is accomplished by and through an optional DSP.

Thus, this embodiment includes a main DSP connected to serially receive the main digital signal and an optional DSP connected to control said optional conditioning circuit and connected to serially receive the digital signal from the optional conditioning circuit. A CPU controls the overall operation of the system including issuing commands to the main and optional DSP's and the main microprocessor controller for controlling the optional conditioning circuit and the main conditioning circuit. In the preferred embodiment, the optional conditioning circuit is a separate optional circuit board and includes a plug system for connecting and disconnecting the optional circuit board to and from the system.

In the preferred embodiment, the memory for the system includes a main bank of random access memory (RAM) and a memory card that is selectively plugged into and out of communication with the data processor. If a memory card is present and functioning properly, the data processor can store data directly to the memory card. However, if the memory card is missing, the data processor can store data in a pseudo-card that is configured in the RAM. In the preferred embodiment the user selects either the installed memory card, or the pseudo-card in RAM as the storage media. A pseudo-card in RAM is created by lower level programming and is designed to configure the memory in RAM in the same manner as a memory card. Thus, the upper level programming in the data processor stores data in only one format, namely the memory card format. To the data processor, the pseudo-card in RAM appears to be identical in data format to the actual memory card.

As previously mentioned, the problems of the prior art relating to frequency are not limited to high frequency problems. Inaccuracy and possible instability also appear in the very low frequencies. In the preferred embodiment, the input conditioning circuitry includes first and second analog to digital converters. The first analog to digital converter receives and samples the conditioned analog signal at a relatively high sample rate to produce a first digital signal, and the second analog to digital converter receives and samples the conditioned analog signal at a relatively low sample rate to produce a second digital signal. The second analog to digital converter includes precision quantizers that are accurate and stable in the conversion of low frequency signals in the range of about one hertz. A data processor receives and processes the first and second digital signals to produce select data for storage.

BRIEF DESCRIPTION OF THE DRAWINGS

The present invention may best be understood by reference to a Detailed Description of preferred embodiments when considered in conjunction with the following Drawings, in which:

FIG. 2 is a simplified block diagram of the hand held analyzer;

FIG. 3 is a more detailed block diagram of the digital conditioning circuit of FIG. 2;

DETAILED DESCRIPTION

Figure 1:
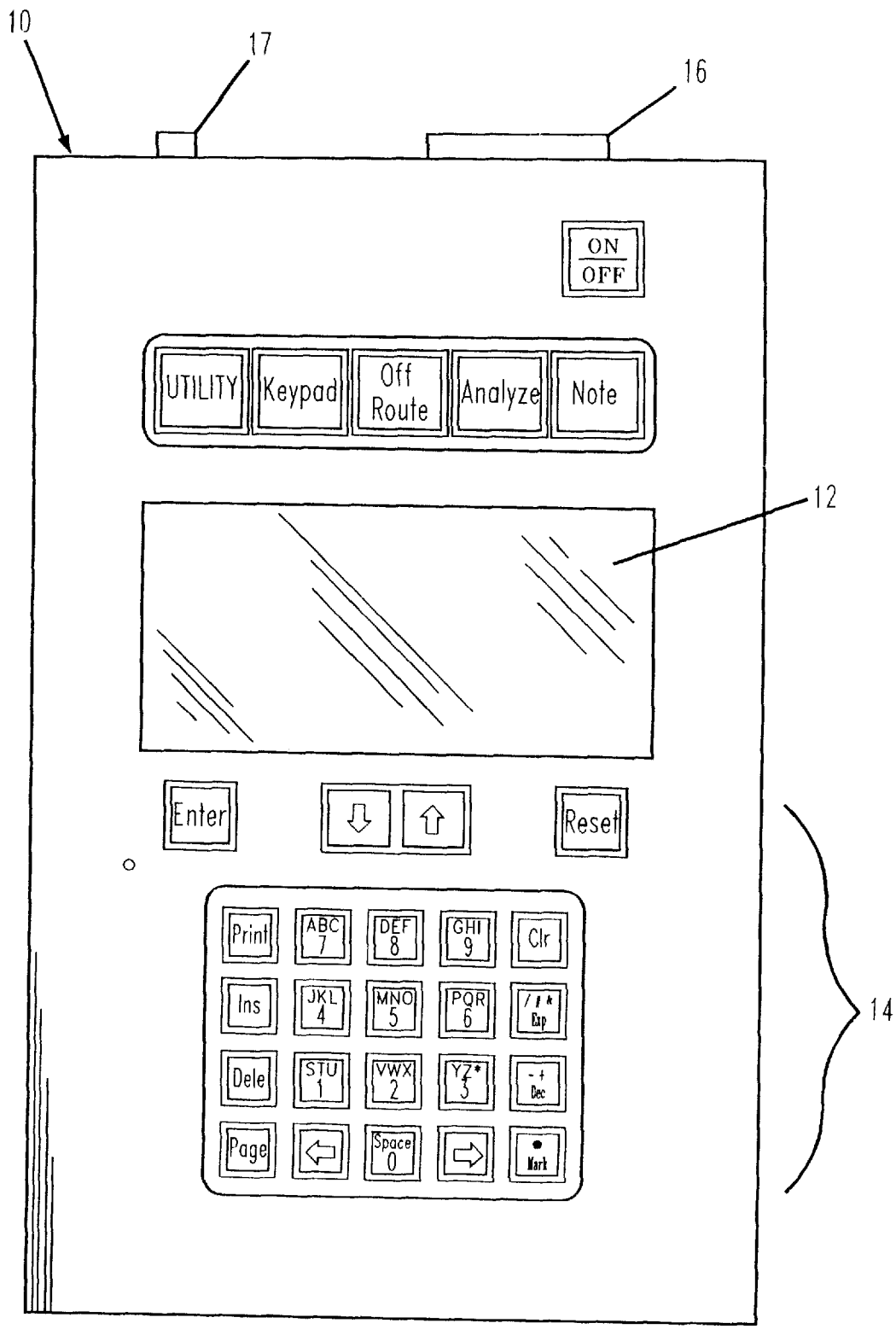
FIG. 1 is a somewhat diagrammatical perspective view of a hand held vibration data collector and analyzer 10.

Referring now to the drawings in which like reference characters designate like or corresponding parts throughout the several views, there is shown in FIG. 1 a hand held vibration data collector and analyzer 10. The height, width, and thickness dimensions of the analyzer 10 are 10.7" by 6.875" by 1.5" and it weighs approximately 4.25 pounds, including a battery. The analyzer 10 includes a keyboard 14 disposed on the face of the analyzer adjacent to a display 12. Control of the analyzer 10 is achieved through the keyboard 14 in combination with the display 12. In a typical operation, set-up conditions for a number of machines are downloaded into the analyzer 10 from a base computer through a connector 16 located at the top of the analyzer 10. Connector 16 is preferably an RS-232 compatible communications part that is also used to receive signals from transducers, such as transducer 18 (FIG. 2). A connector 17 provides a second input channel for receiving signals such as an RPM tach signal. Using the keyboard 14 and the display 12, the operator may cause the analyzer 10 to incrementally step through the downloaded route of machines, or may invoke independent analyzer functions that are totally independent of the route. The physical features of the analyzer 10 as illustrated in FIG. 1 are conventional and may be found in prior art devices.

Referring to FIG. 2, a simplified block diagram of the analyzer 10 is shown. A transducer 18, such as an acceleration, velocity, or displacement transducer, produces an analog signal, such as a vibration signal, that is supplied through line 19 to the analog conditioning circuit 20. Transducer 18 represents one or more transducers, such as an accelerometer and a tachometer, and connectors 16 and 17 are included in the analog conditioning circuit 20. The term "line" as used herein should be regarded as both singular and plural. Depending on its context, "line" may refer to a single wire or electrical path, or it may collectively refer to a plurality of wires or electrical paths. Input control, analog filtering, analog integrating, amplification and D.C. offset functions are performed in the analog conditioning circuit 20 to produce a conditioned analog signal on line 22 which is supplied to a digital conditioning circuit 24. The conditioned analog signal is converted to a digital signal within 10 digital conditioning circuit 24, and preferably, during the digital signal conditioning, the analog signal is Sigma Delta modulated, noise shaped, quantized to a digital signal, digitally filtered and digitally decimated. The conditioned digital signal is supplied through line 26 to a data processor 28, which is preferably a number of processors. The data processor 28 controls the digital conditioning circuitry through line 30 and controls the analog conditioning circuitry through line 32. Also connected to the data processor 28 are a memory 34, a display 12 and a keyboard 14. Preferably, the memory 34 includes RAM, ROM 20o and a PCMCIA external memory card. The display 12 preferably is a luminous display manufactured by Samsung as model number 87-203-0123. The keyboard 14 is preferably a membrane matrix-type keyboard.

Also shown in FIG. 2 is a battery 36 which powers all of the components shown in FIG. 2. The battery 36 is physically connected to power all of the components shown in FIG. 2.

Referring now to FIG. 3, there is shown one possible embodiment of the analog conditioning circuit 20 and the digital conditioning circuit 24. As shown in FIG. 3, the vibration signal is supplied by line 19 to an input control circuit 40. It will be understood that the input control 40 is connected to, and under the control of, the data processor 28. The operator may enter data through the keyboard 14 to instruct the data processor as to the type of transducer being used. Alternatively, the data processor will use downloaded data, or a default parameter, to determine the type of transducer being used. With such information, the data processor provides appropriate instructions to the input control 40 which configures the input for the desired transducer.

The output of the input control 40 is supplied to an optional input filter 42 which is preferably a one kilohertz high-pass filter and may be used for envelope demodulation as described in more detail in U.S. Pat. No. 5,249,138. The output of the filter 42 is supplied to integrators 44 which, under the control of the data processor 28, integrate the input signal once, twice, or not at all. Thus, an acceleration signal may be converted to a velocity signal by integrating once, or used as an acceleration signal. Likewise, a velocity signal can be converted to a displacement signal by integrating once, and an acceleration signal can be converted to a displacement signal by using two stages of integration.

The output from the integrators 44 is provided to a D.C. offset 46 that eliminates D.C. components from the signal, and a gain control 48 selects an appropriate gain and amplifies the signal from the D.C. offset 46 to achieve desired amplitude levels in the signal.

The output from the gain control 48 is supplied to a fixed low-pass filter 50. Preferably, this low pass filter 50 is a six pole Butterworth low-pass filter having a frequency cut-off of 40 kilohertz. The output of the filter 50 is applied through line 22 to an analog to digital converter (ADC) 52 that converts the analog signal to a digital signal and supplies the digital signal to a digital filter 54. The digital filter 54 is under the control of the data processor 28 and digitally filters the digital signal as indicated by the data processor 28. The output of the digital filter 54 is supplied to a digital decimator 56 whose function is to reduce the number of samples in the digital signal. The output of the decimator 56 is supplied on line 26 to the data processor. Again, it will be understood that the components 40, 42, 44, 46, 48, 52, 54, and 56 are connected to and controlled by the data processor 28.

Referring to FIG. 3, one design philosophy of the analyzer 10 may be understood. First, it should be noted that a single fixed frequency low-pass filter 50 is provided, operating at a cut-off frequency of 40 kilohertz. This fixed frequency low-pass filter 50 is in contrast to prior art hand held devices that used variable frequency analog filters that had variable cut-off frequencies, or larger prior art devices that use switchable banks of filters to achieve variable cut-off frequencies, all in the analog domain. The ability to change the analog cut-off frequency of the analog low-pass filters was considered important in prior art devices. However, analyzer 10 makes no attempt to change the analog cut-off frequencies and all low-pass filtering is conducted at a fixed 40 kilohertz rate. By using a fixed frequency low-pass filter, as opposed to variable frequency low-pass filters, all of the accuracy, fidelity and distortion problems associated with variable frequency filters are avoided.

Continuing with reference to FIG. 3, it should be noted that the ADC 52 preferably operates at sampling frequencies of 3.276, 2.6218, 1.96608, 1.6384, 1.3107, 0.98304, 0.65536, and 0.3276, where all values are in megahertz. In the preferred embodiment the data processor 28 controls the clock frequency provided to the ADC 52. Since the low-pass filter 50 operates at 40 kilohertz, one would normally operate the ADC 52 at about 40 kilohertz in accordance with the Nyquist sampling theorem, in order to avoid aliasing problems for a maximum frequency of interest of about 20 kilohertz. However, operating at the sampling rate suggested by the Nyquist theorem would require an extremely sharp cut-off frequency to avoid distortion near the cut-off frequency. In other words, to achieve high fidelity, the cut-off of the low-pass filter must be almost vertical if the Nyquist sampling rate is used. However, by sampling at a much higher rate than necessary and then digitally filtering and decimating the signal, the output signal has the desired sampling frequency, and has increased resolution afforded by the decimation process. Additionally, the requirement for a vertical cut-off at the low-pass frequency by the anti-aliasing filter is not nearly as stringent as when sampling at lower frequencies, and this relaxed requirement introduces no associated reduction in digital signal quality.

In the preferred embodiment, the maximum frequency of interest is 20 kilohertz. According to the Nyquist theorem, the sampling frequency for an input signal of 20 kilohertz should be approximately 40 kilohertz. The cut-off frequency of the low-pass filter 50 is chosen so as to allow sampling of this 20 kilohertz maximum frequency. However, in the preferred embodiment, the chosen output sampling frequency of the filtered and decimated 20 kilohertz signal is 51.2 kilohertz, just somewhat above the minimum Nyquist frequency of 40 kilohertz.

Since the sampling frequency will be reduced by a factor of 64:1 through the filtering and decimation process, the ADC 52 must be operated at a frequency 64 times the desired output sampling frequency of 51.2 kilohertz. This requires the ADC 52 to operate at 3.276 megahertz, which requires a clock frequency of 6.5536 megahertz, which represents the maximum frequency at which the ADC 52 will need to operate, to produce a digital representation of the maximum input frequency of interest, 20 kilohertz, with a resultant sampled frequency of 51.2 kilohertz. If additional filtering and decimation are required, it can be accomplished in the data processor 28 as will be hereinafter described in greater detail.

In the preferred embodiment, the minimum frequency of interest is 2 kilohertz. According to the Nyquist theorem, the sampling frequency for an input signal of 2 kilohertz should be approximately 4 kilohertz. However, since a fixed frequency lowpass filter is being used, the cut-off frequency of the low-pass filter 50 must be chosen so as to allow sampling of the 20 kilohertz maximum frequency. Aliasing problems in the sampled signal would normally occur with a low-pass filter set at a frequency so high above the Nyquist frequency for the frequency of interest. However, because of the high rate of input frequency oversampling and subsequent decimation, aliasing of the 2 kilohertz signal, even when low-pass filtered above the Nyquist frequency, is not a problem. In the preferred embodiment, the chosen output sampling frequency of the filtered and decimated 2 kilohertz signal is 5.12 kilohertz, just somewhat above the minimum Nyquist frequency of 4 kilohertz.

Since the sampling frequency will be reduced by a factor of 64:1 through the filtering and decimation process, the ADC 52 must be operated at a frequency 64 times the desired output sampling frequency of 5.12 kilohertz. This requires the ADC 52 to operate at 327.6 kilohertz, which requires a clock frequency of 655.36 kilohertz, which represents the minimum frequency at which the ADC 52 will need to operate, to produce a digital representation of the minimum input frequency of interest, 2 kilohertz, with a resultant sampled frequency of 5.12 kilohertz. If additional filtering and decimation are required, it can be accomplished in the data processor 28 as will be hereinafter described in greater detail.

Figure 4:
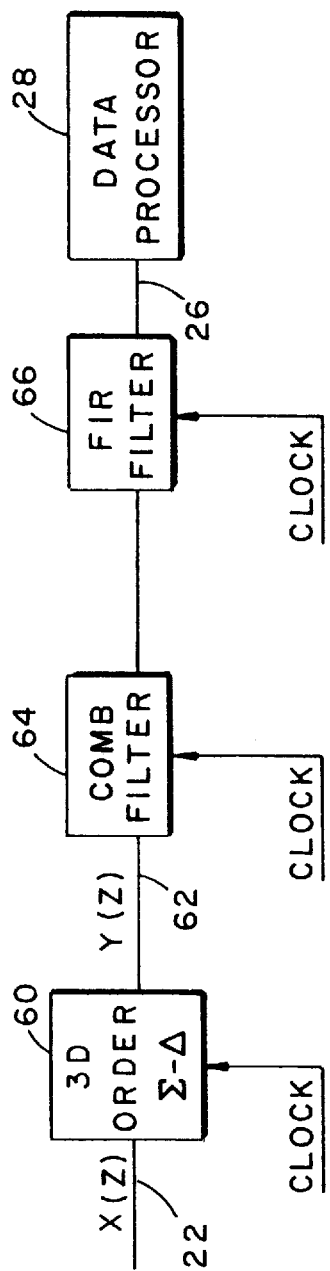
FIG. 4 is a somewhat more detailed block diagram of an analog to digital converter suitable for use in the circuit shown in FIG. 3.

Referring now to FIG. 4, there is shown a preferred embodiment of the ADC 52, filter 54, and decimator 56. Referring to FIG. 4, the analog signal appears on line 22 and is received by a third order cascaded Sigma Delta loop 60 having a transfer function of $Y(z)=X(z)+(1-z^{-1})^3 Q^3(z)$ where $Y(z)$ is the digital output, $X(z)$ is the analog input, and $Q^3$ constitutes the quantization noise produced by the third cascaded Sigma Delta loop. A digital signal $Y(z)$ is produced by the Sigma Delta loop 60 on line 62 and is directed to a comb filter 64. Preferably, the comb filter 64 filters and decimates the incoming signal at a ratio of 16:1. That is, the output sampling rate is reduced by a factor of 16 as compared to the input sampling rate. A finite impulse response (FIR) filter 66 receives the output of the comb filter 64 and provides a 4:1 reduction of the sampling rate.

In the preferred embodiment, the maximum output sampling frequency of the Sigma Delta loop 60 is 3.276 megahertz with one bit of resolution. The comb filter 64 receives the digital signal on line 62 and decimates the signal by a factor of 16. Thus, the maximum output of the comb filter is 204.8 kilohertz, but the signal now has 12 bits of resolution.

The FIR filter 66 receives the output of the comb filter 64 and decimates the signal by a factor of 4. Thus, the output of the FIR filter 66 is 51.2 kilohertz with 16 bits of resolution. It will be understood that the sampling rate of the Sigma Delta loop 60 and the resultant input and output rates of the comb filter 64 and FIR filter 66 are dependent upon a clock frequency, and can be reduced from the numbers previously described by reducing the input clock. In the preferred embodiment, the maximum input sampling rate is 3.276 megahertz, generated by the maximum internal input clock rate of 6.5536 megahertz. After a decimation of 64:1, this results in an output sampling rate at the FIR filter 66 of 51.2 kilohertz. However, the output sampling rates from the FIR filter 66 may be adjusted from 51.2 kilohertz down to 5.1 kilohertz by adjusting the input clock frequency down to 655.36 kilohertz. Likewise, the output sampling rates of the comb filter 64 may be adjusted from 204.8 kilohertz down to 20.48 kilohertz.

Figure 5:
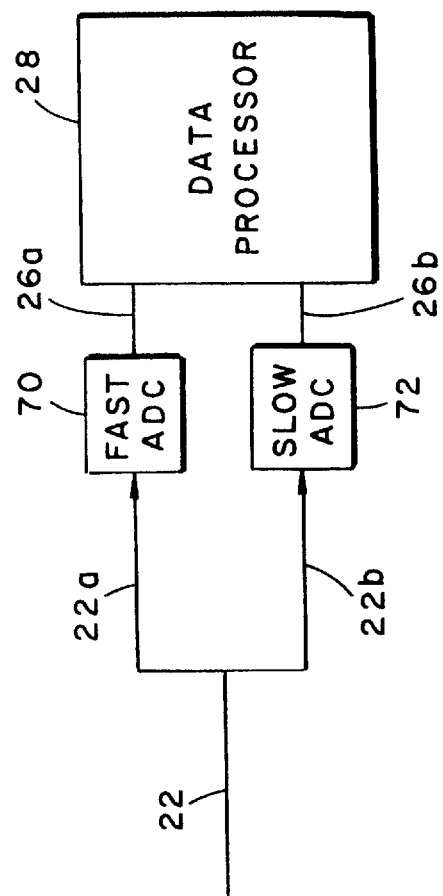
FIG. 5 is a block diagram showing an alternate embodiment for the analog to digital converter shown in FIG. 3.

Referring now to FIG. 5, an alternate embodiment of the ADC 52 is shown. In the embodiment of FIG. 5, the ADC 52 is two converters, namely, a fast ADC 70 and a slow ADC 72. The slow ADC 72 operates at an input sampling rate of 20 hertz and produces an output sample rate of 20 hertz with 12 bits of resolution. The fast ADC 70 operates as described for Sigma Delta loop 60, comb filter 64, and FIR filter 66 as depicted in FIG. 4. The signals from both ADC 70 and 72 are provided to the data processor 28 on lines 26*a* and 26*b*, respectively. The data processor 28 may choose to process the signal of one or both of the ADC's 70 and 72 depending upon its operator instructions or a downloaded program. Preferably, the slow ADC is model number LTC1294, manufactured by Linear Technology Incorporated, and the fast ADC is model number DSP56ADC16, manufactured by Motorola.

Generally, a fast ADC operates at a fast input sampling rate which may produce accuracy or stability problems when receiving low frequency signals, especially those signals having a frequency on the order of 1 hertz or less. It is known that some prior art devices become unstable when input signals have a frequency of less than 1 hertz. Therefore, by the provision of a slow ADC 72, low frequency signals are sampled in a stable and accurate manner. In some applications, low frequency signals are extremely important and must be measured with great accuracy to achieve meaningful results. Thus, by the provision of a slow ADC 72, such measurements may be made without sacrificing the speed of the instrument and without accepting accuracy limitations of fast ADC's such as disclosed with reference to FIG. 4.

Figure 6:
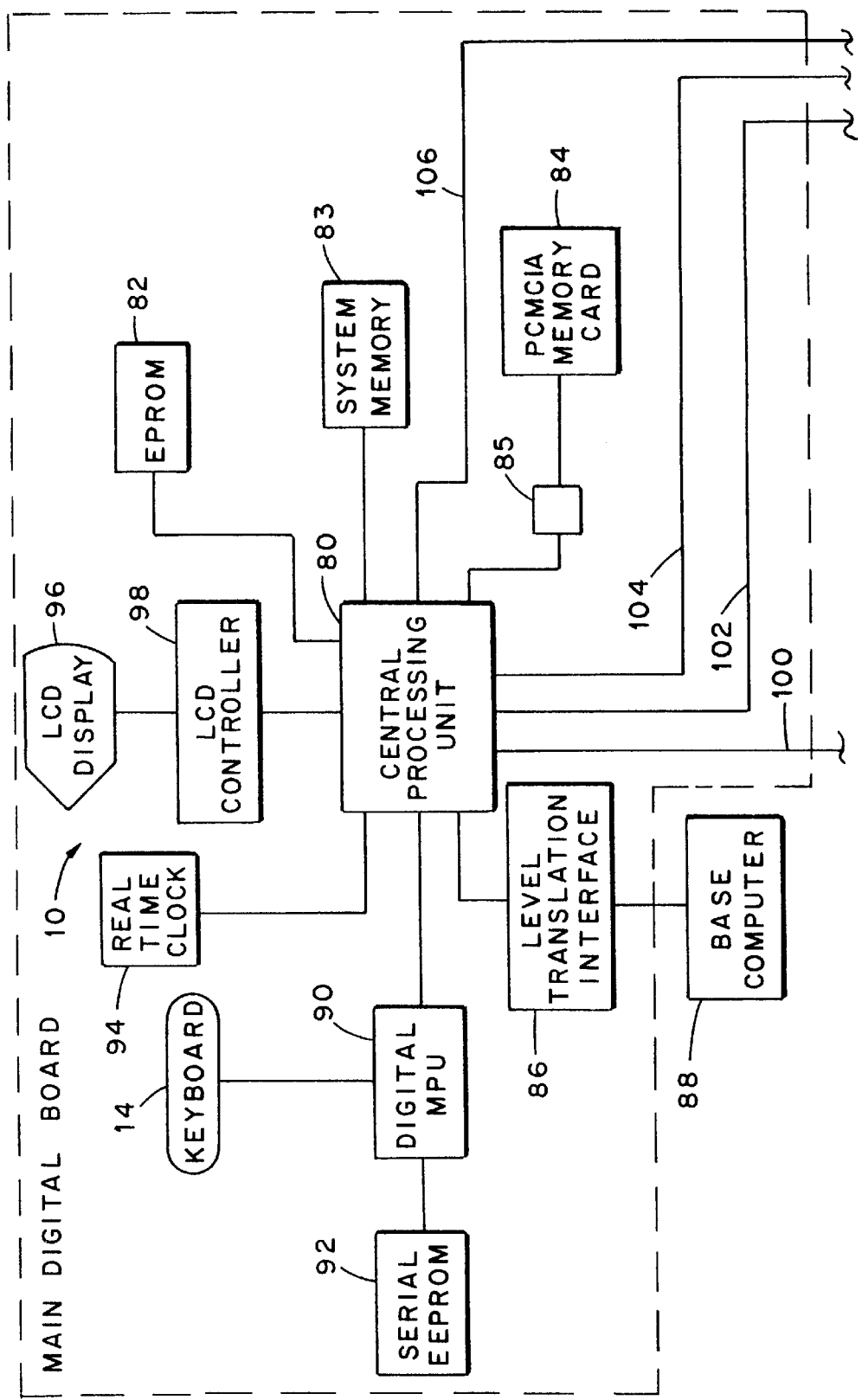
FIG. 6 is a schematic block diagram of a preferred main digital board corresponding to the data processor, memory, display and keyboard of FIG. 2.
Figure 7:
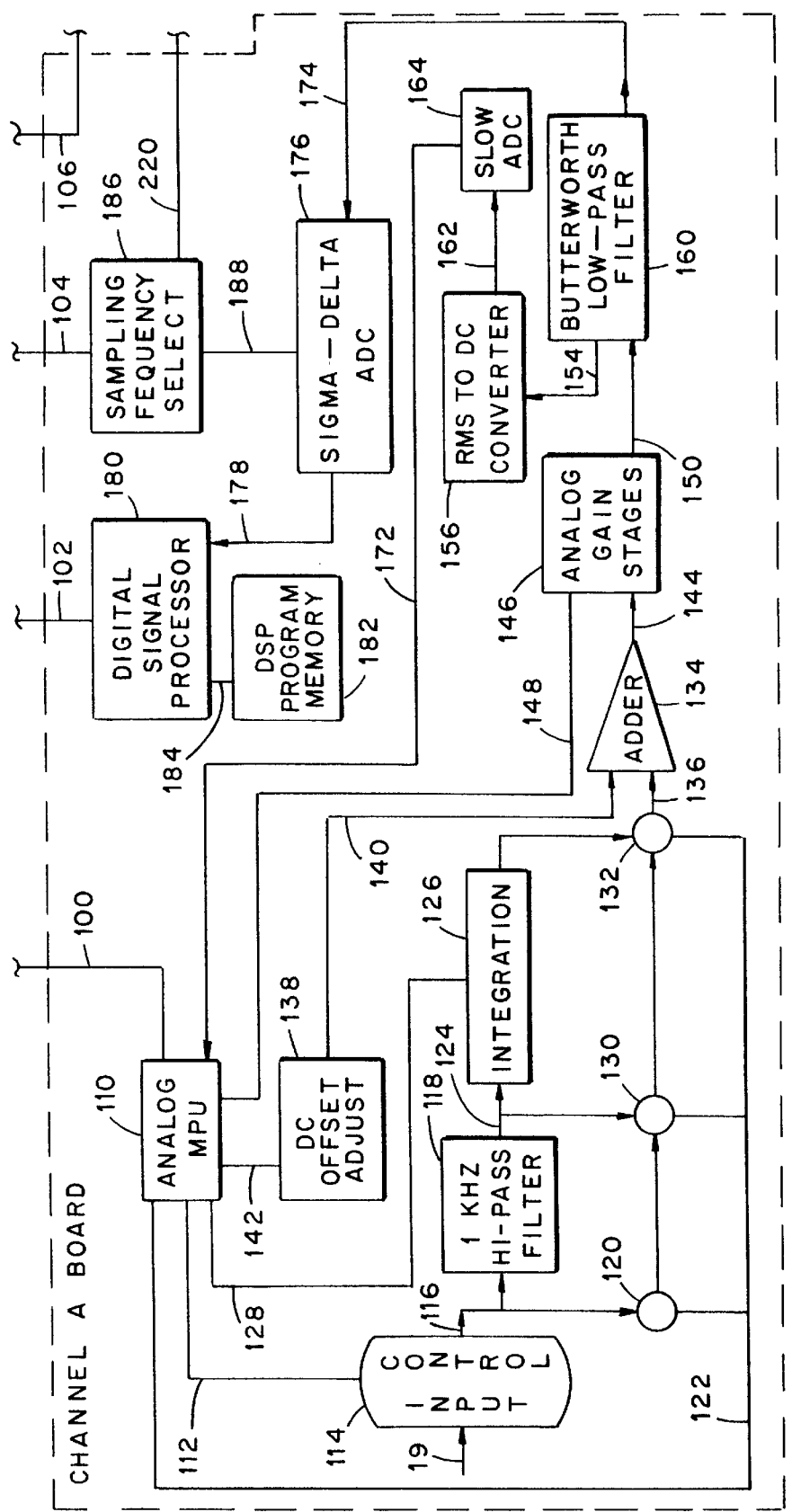
FIG. 7 is a schematic block diagram of a channel A board which, in a preferred embodiment, constitutes part of the digital conditioning block shown in FIG. 2.
Figure 8:
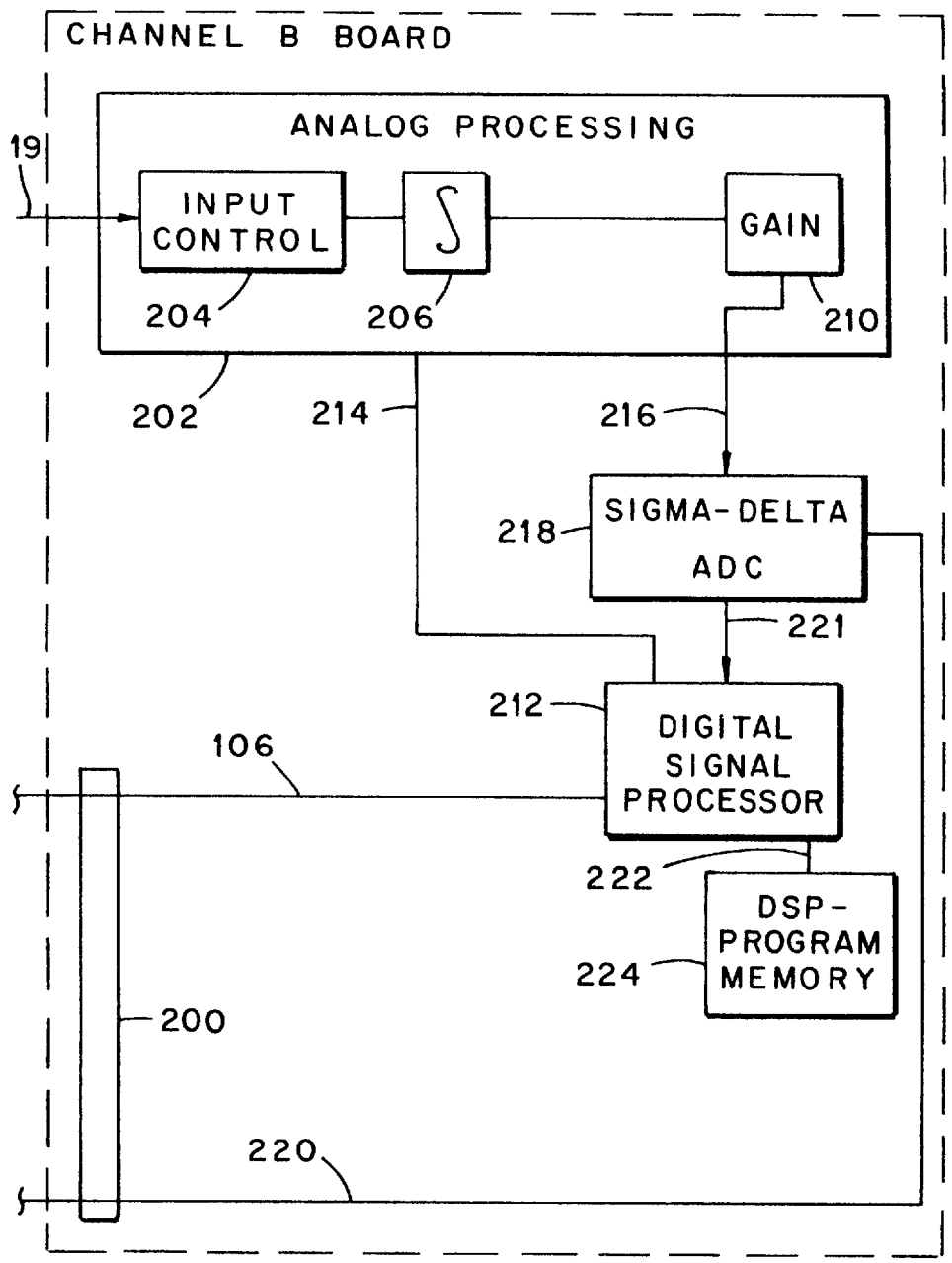
FIG. 8 is a schematic block diagram of a channel B board which, in a preferred embodiment, constitutes part of the digital conditioning block shown in FIG. 2.

Referring now to FIGS. 6, 7 and 8, a detailed disclosure of a preferred embodiment is shown. In this particular embodiment, the analyzer 10 utilizes a channel A board shown in FIG. 7, which may be regarded as a permanent part of the analyzer 10, and an optional channel B board is shown in FIG. 8. The channel B board of FIG. 8 is designed with increased simplicity as compared to the channel A board of FIG. 7, and detachably plugs into a connection with the channel A board of FIG. 7.

Referring now to FIG. 6, the main digital board includes a central processing unit (CPU) 80 which is preferably a Z8S180 manufactured by Zilog. The CPU 80 includes an internal DMA allowing other processors to directly access memory without interrupting the CPU 80. An EPROM 82 is interfaced with the CPU 80 and functions primarily to store the operating program of the CPU 80. Also, a system memory 83 is interfaced with the CPU 80, and it stores data downloaded by computer, collected by the analyzer 10, or provided by the operator. It also stores the operating program when analyzer 10 is operating. A PCMCIA memory card 84 is connected through a conventional memory plug 85 to the central processing unit 80, and its primary function is to store collected data. By means of low level programming executed by the CPU 80, the RAM system memory 83 is configured to appear as a PCMCIA memory card, and this appearance will be referred to as pseudo-card memory. By employing pseudo-card memory, the CPU 80 utilizes the same format for storing data even though two types of memory are utilized. When the RAM system memory 83 is being utilized, it is utilized as a pseudo-card, and thus the format of the data supplied to or received from the RAM system memory 83 is identical to the format of the data supplied to or received from the PCMCIA memory card 84.

In addition to reducing memory complexity, the use of pseudo-card memory reduces the programming needed to store data in two types of memory, and it reduces the programming and processing overhead required when data is transferred from RAM system memory 83 to the PCMCIA memory card 84, or vice versa. Data that is collected by the CPU 80 and downloaded into the PCMCIA memory card 84 may be transferred through an RS232 level translation interface 86 to a base computer 88. It is understood that the RS232 interface 86 is part of the analyzer 10 and is connected and disconnected from the base computer 88 as desired.

As opposed to transferring data through the interface 86 to the base computer 88, one may also transfer data to the base computer 88 by unplugging the PCMCIA memory card 84 from plug 85 and plugging the card into the base computer 88. In such case, the base computer would simply access and read the PCMCIA memory card 84 directly to receive the collected and analyzed data.

A digital MPU 90 is also interfaced with CPU 80 for reading keyboard 14 and a serial EEPROM 92. In the preferred embodiment, the MPU 90 is a model 68HC705C8, manufactured by Motorola. The primary function of the MPU 90 is to receive signals from the keyboard 14 and interface such signals with the CPU 80 through appropriate interrupt programming. In addition, the MPU 90 is interfaced with serial EEPROM 92 which stores specialized data, such as a unique serial number to identify a particular analyzer 10. The downloaded serial number is particularly useful in electronically identifying a particular analyzer 10 so that programs can independently determine whether they are loaded on the correct analyzer 10. This serial number may be regarded as a security device for both the owner of the analyzer 10 and the supplier of software for use in the analyzer 10.

A real time clock 94 is also interfaced with the CPU 80, and the CPU 80 provides clock signals to all digital components requiring such signals. An LCD display 96, preferably model number 87-203-0123, manufactured by Samsung is connected through an LCD controller 98 to the CPU 80. The LCD controller 98 is preferably model number E1330, manufactured by Epson, and it includes its own memory subsection to store at least one screen of information. The memory 34 as shown in FIG. 2 may be regarded as the EPROM 82, the RAM system memory 83, the PCMCIA memory card 84, the memory of MPU 90, the EEPROM 92, the memory of LCD controller 98, and the DSP memory 182. The CPU 80 communicates with the channel A board of FIG. 7 through lines 100, 102, and 104, and communicates with the channel B board of FIG. 8 through line 106.

Referring now to FIG. 7, line 100 interfaces CPU 80, depicted in FIG. 6, with MPU 110, which is preferably model number 68HC705C8, manufactured by Motorola, and line 100 is preferably a digital bus. The MPU 110 functions to control the overall operation of the channel A board of FIG. 7. Through line 112, the MPU 110 controls an input control 114 which corresponds to input control 40 shown in FIG. 3. The input signal on line 19 may be an acceleration, velocity, or displacement signal or it could represent temperature, pressure or any other parameter that may be represented by an electrical signal. The input control 114 configures the analyzer 10 to appropriately receive the signal on input line 19.

The signal from the input control 114 is applied through line 116 to a 1 kilohertz high-pass filter 118, and a switch 120 that is controlled through lines 122 by the MPU 110. The output of the filter 118 is applied through line 124 to an integration circuit 126 whose operation is controlled through line 128 by the MPU 110. The integration circuit 126 will integrate the signal once or twice depending upon the control input from the analog MPU 110. The output of the filter 118 is also applied through line 124 to a switch 130 that also receives the output of the switch 120. Switch 130 is controlled through line 122 by the MPU 110. The output of the integration circuit 126 and the output of the switch 130 are applied to a switch 132 which is controlled by the MPU 110 through line 122. Through switches 120, 130 and 132, it will be appreciated that the MPU 110 can bypass or use filter 118, and bypass or use the integration circuit 126 to produce an output signal at the output of switch 132.

An adder 134 receives the output of the switch 132 through line 136, and the other input of adder 132 is provided by a D.C. offset adjust 138 which is supplied through line 140. The D.C. offset adjust 138 is controlled by MPU 110 through line 142. The CPU 80 monitors the output signal of the channel A board, and through the MPU 110 controls the D.C. offset adjust 138 to eliminate D.C. components from the output of the channel A board. The output of adder 134 is applied through line 144 to analog gain stages 146 that are controlled by the MPU 110 through line 148. The analog gain stages 146, in conjunction with the MPU 110, perform an autoranging function so that the output of the stages 146 are supplied within a desired amplitude range. The output of the analog gain stages 146 is supplied through line 150 to a low-pass filter 160, which is preferably a fixed frequency, six pole, 40 kilohertz, Butterworth low-pass filter.

The output of the low-pass filter 160 is applied through line 174 to an ADC 176, preferably model DSP56ADC16, manufactured by Motorola, whose output is applied through line 178 to a digital signal processor (DSP) 180, preferably a DSP 56002, manufactured by Motorola. The output of the converter 156 is also supplied through line 154 to an RMS to DC converter 156. The output of the converter 156 is supplied through line 162 to a slow ADC 164, which is preferably model number LTC1294, manufactured by Linear Technology, Inc. The output of the ADC 164 is applied through line 172 to the MPU 110.

The output of the DSP 180 is supplied by lines 102 to the CPU 80. In the preferred embodiment, the output of the DSP 180 is supplied almost directly to the RAM system memory 83 through the DMA of the CPU 80 without interrupting the CPU 80. The DSP 180 both sends and receives signals from the CPU 80 through line 102. Thus, under the control and instruction of the CPU 80, in the preferred embodiment, the DSP 180 performs low-pass filtering operations, zoom operations, Fast Fourier Transform operations, and other manipulations of the incoming data, and then transfers the processed data to the RAM system memory 83 through the DMA without interrupting the CPU 80.

The DSP 180 is interfaced with its own program memory 182 through line 184. The sampling frequency of the ADC 176 is controlled by the sampling frequency select 186 through line 188. Select 186 is controlled by the CPU 80 through line 104.

Referring now to FIG. 8, the channel B board is shown. The channel B board may be plugged into, or unplugged from, the analyzer 10 by a conventional digital plug system 200, which is preferably a model 532956-1 manufactured by AMP, Inc. The channel B board includes an analog processing portion 202 that is a simplified version of the analog section shown in FIG. 7. The analog processing portion 202 includes an input control 204 analogous to input control 114 of FIG. 7. Likewise, the integrator 206 is analogous to integration circuit 126. Finally, the gain circuit 210 is analogous to the analog gain stages 146.

The components 204, 206, and 210 of the analog processing portion 202 are all under the control of a DSP 212 mounted on the channel B board and connected to the analog processing portion 202 through line 214. Thus, the DSP 212 has additional control duties that are not assumed by the DSP 180 of the channel A board depicted in FIG. 7. This structure facilitates the plug-in capability of the channel B board. In the channel A board, the control functions were provided by the MPU 110. The output of the analog processor portion 202 is supplied through line 216 to an ADC 218, which is preferably a model DSP56ADC16 manufactured by Motorola. The sampling frequency of the ADC 218 is controlled by the sampling frequency select 186, as seen in FIG. 7, through line 220. As previously noted, the sampling frequency select 186 is controlled by the CPU 80, and thus both ADC's 176 and 218, when operating simultaneously, will operate at the same sampling frequency. The output of the ADC 218 is supplied through line 221 to the DSP 212 whose output is supplied through line 106 and plug 200 to the CPU 80. Also, the DSP 212 is connected by line 222 to a DSP program memory 224.

In a typical operation, the base computer 88 will download a route through the interface 86 to the CPU 80 which stores the route in RAM system memory 83. The route would typically include a list of machines, and for each list of machines a number of test points would be specified. For each test point, set-up parameters and data storage parameters would be listed. The set-up parameters would include such things as the type of sensor to be used, the preferred units, the frequency range of interest, the type of data to be displayed, the specific data to be stored and other parameters associated with the measurement point, such as the identity of the machine, the identity of the measurement point, a description of the measurement point, the date and time, etc.

The CPU 80 downloads the parameters for one measurement point to the MPU 110 of the channel A board, and it downloads the parameters for a second measurement point to the DSP 212 of the channel B board. The CPU 80 also supplies the sampling frequency to the sampling frequency select 186, which is based upon the highest frequency of interest for the two test points being monitored by the channel A and B boards of FIGS. 7 and 8. In response to the sensor parameters, the MPU 110 properly configures the input control 114 and the DSP 212 configures the input control 204. Depending upon the type of input signal being received and the type of output signal that is desired, the MPU 110 will appropriately adjust and use or not use the integration circuit 126 and, likewise, the DSP 212 will adjust, use or not use the integrators 206.

Once the input signal is appropriately amplified and D.C. components are removed, the input signal is supplied through the ADC 176 to the DSP 180, and the other signal is supplied through the ADC 218 to the DSP 212. Each DSP 180, 212 then performs the desired function which was previously downloaded by the CPU 80. Typically, each DSP 180, 212 will perform a Fast Fourier Transform on the incoming signal to produce a frequency spectrum of interest. That frequency spectrum will typically be transferred directly to RAM system memory 83 through the CPU 80 and, likewise, the spectrum will be transferred from the RAM system memory 83 through the DMA of CPU 80 to the LCD controller 98 for display on the LCD display 96.

It will be appreciated that the DSP's 180 and 212 are serially receiving the digital input signal and are calculating and analyzing the data independently of the CPU 80, without interrupting the CPU 80. Specifically, both DSP's 180, 212 typically will perform Fast Fourier Transform calculations and then perform a rasterization function to graphically display the spectrum produced by the Fast Fourier Transform. Each DSP 180, 212 also identifies data that needs to be stored in accordance with instructions previously received from the CPU 80. For example, once a spectrum is calculated, the stored instructions may specify storage of the amplitude of the spectrum at six selected frequencies. In such case, the DSP's 180 and 212 identify the six selected frequencies of interest and transfer the selected data through the DMA of the CPU to the PCMCIA memory card 84, if the user so desires, where the data is stored in a memory card format. Alternatively, if a PCMCIA memory card 84 is not plugged in, the data can be stored in RAM system memory 83 in a pseudo-card format.

It will be appreciated that the DSP's 180 and 212 operate independently and serially upon the incoming signal to receive, analyze and store the data, all without interrupting the CPU 80.

This leaves the CPU 80 free to conduct other control activities as previously explained and, therefore, greatly increases the speed of the overall analyzer 10 by distributing computation and control responsibilities among DSP 180, DSP 212, CPU 80, MPU 110, LCD controller 98, and MPU 90. In particular, speed is enhanced by serially processing the data using the DSP's 180 and 212. It will be understood that when two channels are used, such as the channel A board of FIG. 7 and the channel B board of FIG. 8, there are two input signals that are typically received from two different vibration transducers.

Since channel A and channel B function virtually independently, there is no need for the vibration sensors to be of the same type, and in fact, the sensors may sense different parameters such as vibration and temperature. For purposes of simplicity, the design shown in FIGS. 6, 7 and 8 utilizes a frequency select 186 that locks the sampling frequencies of the two ADC's 176 and 218 such that each converter must have the same sampling frequency when operating simultaneously. This is a design choice and it would be possible to operate the converters at different sampling rates if desired.

Referring again to FIG. 3, one may best appreciate advantages of the present invention. The advantages of a fixed low-pass filter have been previously discussed, but there are advantages in providing a digital filter 54 and a digital decimator 56 as part of digital conditioning hardware positioned upstream from the data processor 28. For example, assume that an operator wanted to see a spectrum of the signal for frequencies between 9 and 10 kilohertz. Producing a frequency spectrum over this frequency band only is defined as a true zoom function. To begin the operation, the clock signal to the ADC 52, digital filter 54, and the digital decimator 56 is chosen so as to effectively low-pass filter the incoming signal at a frequency above 10 kilohertz but as close to 10 kilohertz as possible.

In the preferred embodiment, a clock signal of 3.276 megahertz would be chosen, and the effective low-pass cut-off frequency of the digital filter 54 would be about 10 kilohertz with an output sample rate of 25.6 kilohertz after filtering and decimation. The digital signal is then fed to the data processor 28 where, under software processing, the incoming digital signal is frequency-shifted down by 9.5 kilohertz, which means that the center point, 9.5 kilohertz, of the frequency band of interest, 9 to 10 kilohertz, is shifted to 0 hertz. Thus, the frequency band of interest in the shifted signal now extends from negative 0.5 kilohertz to positive 0.5 kilohertz. Next, the frequency shifted signal is digitally low-pass filtered in the data processor 28 using a cut-off frequency of 0.5 hertz. The digital low-pass filter removes frequency content in the signal that is above 0.5 kilohertz and is below negative 0.5 kilohertz. Thus, the remaining signal, negative 0.5 kilohertz to positive 0.5 kilohertz, constitutes the frequency band of interest.

A Fast Fourier Transform is then performed on this band of interest in the data processor 28 to produce a spectrum, and the spectrum is shifted up by 9.5 kilohertz to produce a frequency spectrum extending from 9 kilohertz to 10 kilohertz. That is, the frequency spectrum line at negative 0.5 kilohertz would be shifted up to 9 kilohertz, and the frequency spectrum line at 0.5 kilohertz would be shifted up to 10 kilohertz. All of the remaining frequency lines would be shifted up accordingly. The ability to first digitally filter and decimate the signal outside of the data processor 28 enables one to minimize the processing demands on the data processor 28, and thus enables this particular instrument to perform zoom operations on the fly in real time. Such zoom processing would be more difficult without the outside hardware performing filtering and decimation functions. The zoom processor of the present invention may be best understood by reference to the source code in the appendix.

In accordance with another aspect of the invention, which has been previously described in some detail, the RAM system memory 83 is configured in a pseudo-card format. This format is achieved by using a pseudo-card low level program which is disclosed in the source code in the appendix.

Having described preferred embodiments of the invention, it will be appreciated that the vibration data analyzer achieves superior stability, accuracy and reliability through the use of fixed frequency anti-aliasing filters. In addition, stability and accuracy is further enhanced through the use of two ADC's, one for high frequency signals, and one for low frequency and D.C. signals. Efficient digital filtering and decimation is achieved by splitting the processing demands between specialized hardware filters and decimators and software filters and decimators implemented in a data processor. A true zoom method is employed to take advantage of the filtering and decimation capabilities of the analyzer, and frequency shifting techniques are used to reduce demands on the data processor when producing a true zoom.

By using independent DSP's that serially operate on incoming signals, the demands on the data processor, particularly the CPU, are further reduced. In addition, the RAM system memory is formatted as a pseudo-card to facilitate the use of a PCMCIA memory card or the RAM system memory. While preferred embodiments of the present invention have been described above, it will be appreciated by those of ordinary skill in the art that the invention is capable of numerous modifications, rearrangements and substitutions of parts without departing from the spirit of the invention.

What is claimed is:

1. A data collector and analyzer system comprising:
   a vibration transducer for sensing vibration and for producing an analog vibration signal corresponding to the vibration;
   a conditioning circuit for receiving and conditioning the analog vibration signal from the vibration transducer to produce a conditioned analog signal, and having:
      (a) a filter for producing the conditioned analog signal having a desired frequency range;
      (b) an amplifier for producing the conditioned analog signal at a desired amplitude;
      (c) an analog to digital converter (ADC) for receiving and sampling the conditioned analog signal to produce a digital signal;
   a data processor for processing the digital signal to produce desired digital data, the data processor including:
      a transformer for selectively operating on the digital signal, performing a Fast Fourier Transform, and producing frequency spectrum data from the digital signal;
      a digital signal processor (DSP) connected to receive and for operating on the digital signal and independently performing Fast Fourier Transforms on the digital signal to produce a frequency spectrum; and
      a central processing unit (CPU) for controlling the operation of the system including the operation of the DSP, the DSP performing the Fast Fourier Transform independently of the CPU;
   memory interfaced with the data processor for storing at least some of the digital data;
   the DSP for generating a graphical representation of the frequency spectrum, and transferring the graphical representation to the memory; and
   a direct memory access (DMA) for transferring data directly to the memory without interrupting the CPU, the DMA transferring data including the frequency spectrum and the graphical representation from the DSP to the memory.

2. The system of claim 1 wherein the DSP performs a true zoom operation on the digital signal to produce a zoom digital signal representative of a selected frequency band in the digital signal.

3. The system of claim 1 wherein the DSP in response to commands from the CPU performs a low-pass filtering and decimation operation on the digital signal independently of the CPU to produce a filtered digital signal having a reduced sample rate as compared to the digital signal and being representative of a portion of the digital signal having a frequency below a selected upper frequency.

4. The system of claim 1 wherein the DSP in response to commands from the CPU performs:

a low-pass filtering and decimation operation on the digital signal independently of the CPU to produce a filtered digital signal having a reduced sample rate as compared to the digital signal and being representative of a portion of the digital signal having a frequency below a selected upper frequency;

a zoom operation independently of the CPU signal to produce a zoom digital signal representative of a selected frequency band in the digital signal; and a Fast Fourier Transform independently of the CPU to produce a frequency spectrum representative of a frequency content of the digital signal.

5. A data collector and analyzer system comprising:
   a vibration transducer for sensing vibration and for producing an analog vibration signal corresponding to the vibration;
   a conditioning circuit for receiving and conditioning the analog vibration signal from the vibration transducer to produce a conditioned analog signal, and having:
      (a) a filter for producing the conditioned analog signal having a desired frequency range;
      (b) an amplifier for producing the conditioned analog signal at a desired amplitude;
      (c) an analog to digital converter (ADC) for receiving and sampling the conditioned analog signal to produce a digital signal;
   a data processor for processing the digital signal to produce desired digital data, the data processor including:
      a transformer for selectively operating on the digital signal, performing a Fast Fourier Transform, and producing frequency spectrum data from the digital signal;
      a digital signal processor (DSP) connected to receive and for operating on the digital signal and independently performing Fast Fourier Transforms on the digital signal to produce a frequency spectrum; and
      a central processing unit (CPU) for controlling the operation of the system including the operation of the DSP, the DSP performing the Fast Fourier Transform independently of the CPU;
   memory interfaced with the data processor for storing at least some of the digital data;
   a memory card for storing data in a card format:
   a plug system for connecting and disconnecting the memory card to and from the system;
   a random access memory (RAM) interfaced with the data processor for storing data; and
   a RAM formatter for controlling the flow of data to and from the RAM and configuring the RAM as a pseudo-card so that the RAM in conjunction with the RAM formatter functions substantially identically as the memory card, receiving and transmitting data in card format.

6. The system of claim 5 wherein the data processor further comprises a digital filter for optionally digitally filtering the digital signal to produce a modified digital signal.

7. The system of claim 5 wherein the data processor further comprises a digital filter and decimator for optionally reducing the sample rate and frequency content of the digital signal to produce a modified digital signal.

8. A data collector and analyzer system comprising:
   a vibration transducer for sensing vibration and for producing an analog vibration signal corresponding to the vibration;

a conditioning circuit for receiving and conditioning the analog vibration signal from the vibration transducer to produce a conditioned analog signal, and having;
  (a) a filter for producing the conditioned analog signal having a desired frequency range;
  (b) an amplifier for producing the conditioned analog signal at a desired amplitude; and
  (c) an analog to digital converter (ADC) for receiving and sampling the conditioned analog signal to produce a digital signal, and having:
    (1) a sigma-delta modulator having a number of cascaded sigma-delta loops and having a transfer function substantially of:

$$(z)=X(z)+(1-Z^{-1})^{-n}Q^n(Z)$$

where $Q^n$ is the quantization noise from the sigma-delta modulator and n is the number of cascaded sigma-delta loops, the modulator receiving the conditioned analog signal and producing a digital modulator signal;
    (2) a filter for digitally low-pass filtering and decimating the digital modulator signal to produce the digital signal for the data processor;
a data processor for processing the digital signal to produce desired digital data, the data processor including:
  a transformer for selectively operating on the digital signal, performing a Fast Fourier Transform, and producing frequency spectrum data from the digital signal; and
memory interfaced with the data processor for storing at least some of the digital data.

9. A data collector and analyzer system comprising:
a vibration transducer for sensing vibration and for producing an analog vibration signal corresponding to the vibration;
a conditioning circuit for receiving and conditioning the analog vibration signal from the vibration transducer, and having;
  a main conditioning circuit for receiving and conditioning the analog signal from the transducer to produce a conditioned main analog signal, and having:
    (a) a filter having an upper cutoff frequency for producing the conditioned main analog signal having a desired frequency range;
    (b) an amplifier for producing the conditioned main analog signal at a desired amplitude;
    (c) a main analog to digital converter (ADC) for receiving and sampling the conditioned main analog signal to produce a main digital signal; and
    (d) a main microprocessor controller for controlling the main conditioning circuit; and
  an optional conditioning circuit for receiving and conditioning the analog signal from the transducer to produce a conditioned optional analog signal, and having:
    (a) a filter having an upper cutoff frequency for producing the conditioned optional analog signal having a desired frequency range;
    (b) an amplifier for producing the conditioned optional analog signal at a desired amplitude; and
    (c) an optional ADC for receiving and sampling the conditioned optional analog signal to produce an optional digital signal;
a data processor for processing the main and optional digital signals to produce desired digital data, the data processor including:
  a main transformer for selectively operating on the main digital signal, performing a Fourier Transform, and producing frequency spectrum data from the main digital signal; and
  an optional transformer for selectively operating on the optional digital signal simultaneously with the main transformer operation, performing a Fourier Transform, and producing frequency spectrum data from the optional digital signal; and
memory interfaced with the data processor for storing at least some of the digital data.

10. The system of claim 9 wherein the main and optional conditioning circuits further comprise main and optional hardware for receiving and sampling the conditioned main analog signal and the conditioned optional analog signal, respectively, at sample frequencies that are substantially greater than maximum frequencies of interest to produce main and optional digital signals, and further for digitally low-pass filtering and digitally decimating the main and optional digital signals, respectively, to produce main and optional conditioned digital signals having reduced sample rates as compared to the main and optional digital signals, respectively, and having predetermined upper cutoff frequencies.

11. A hand held data collector and analyzer system comprising:
a main transducer for sensing analog data and for producing a main analog signal corresponding to the analog data;
an optional transducer for sensing analog data and for producing an optional analog signal corresponding to the analog data;
a main conditioning circuit for receiving and conditioning the main analog signal from the main transducer to produce a conditioned main analog signal, and having;
  (a) a filter having an upper cutoff frequency for producing the conditioned main analog signal having a desired frequency range;
  (b) an amplifier for producing the conditioned main analog signal at a desired amplitude;
  (c) a main analog to digital converter (ADC) for receiving and sampling the conditioned main analog signal to produce a main digital signal; and
  (d) a main microprocessor controller for controlling the main conditioning circuit;
an optional conditioning circuit for receiving and conditioning the optional analog signal from the optional transducer to produce a conditioned optional analog signal, and having;
  (a) a filter having an upper cutoff frequency for producing the conditioned optional analog signal having a desired frequency range;
  (b) an amplifier for producing the conditioned optional analog signal at a desired amplitude; and
  (c) an optional ADC for receiving and sampling the conditioned optional analog signal to produce an optional digital signal;
a main digital signal processor (DSP) for receiving and selectively operating on the main digital signal, performing a Fast Fourier Transform, and producing a main frequency spectrum;
an optional DSP for receiving and selectively operating on the optional digital signal, performing a Fast Fourier Transform, and producing an optional frequency spectrum;
a central processing unit (CPU) for controlling the operation of the system, including issuing commands to the optional DSP and the main microprocessor controller;

a main interface for connecting the CPU to the main DSP and the main microprocessor controller;

an optional interface for connecting the CPU to the optional DSP;

the main microprocessor controller for controlling the main conditioning circuit in response to commands from the CPU;

the optional DSP for controlling the optional conditioning circuit in response to commands from the CPU; and memory interfaced with the CPU and the main and optional DSP's for storing information.

12. The system of claim 11 wherein:

the main and optional conditioning circuits further comprise main and optional hardware for receiving and sampling the conditioned main analog signal and the conditioned optional analog signal, respectively, at sample frequencies that are substantially greater than maximum frequencies of interest to produce main and optional digital signals, and further for digitally low-pass filtering and digitally decimating the main and optional digital signals, respectively, to produce main and optional conditioned digital signals having reduced sample rates as compared to the main and optional digital signals, respectively, and having predetermined upper cutoff frequencies; and the main and optional DSP's further comprising main and optional digital low-pass filters and decimators, respectively, for optionally and selectively reducing the sample rates and frequency content of the main and optional conditioned digital signals to produce main and optional modified conditioned digital signals.

13. The system of claim 11 wherein the main DSP and the optional DSP, in response to commands from the CPU, perform:

a low-pass filtering and decimation operation independently of the CPU to produce main and optional filtered digital signals, respectively, having reduced sample rates as compared to the main and optional digital signals, respectively, and being representative of a portion of the main and optional digital signals;

a zoom operation independently of the CPU to produce main and optional zoom digital signals, respectively, representative of selected frequency bands in the main and optional digital signals; and a Fast Fourier Transform independently of the CPU to produce frequency spectrums representative of a frequency content of the main and optional digital signals.

14. The system of claim 11 wherein the optional conditioning circuit further comprises:

a separate optional circuit board; and plug means for selectively connecting and disconnecting the optional circuit board to and from the system.

15. The system of claim 11 wherein:

the main and optional DSP's operate on and analyze the main and optional digital signals independently of the CPU to produce main and optional analyzed digital signals representing selected properties of the main and optional digital signals, and transmit the analyzed digital signals to the memory independently of the CPU; and the CPU includes a direct memory access (DMA) interconnected with the main and optional DSP's and with the memory for transferring data from the main and optional DSP's to the memory without interrupting the CPU.

16. The system of claim 11 wherein the filter further comprises a fixed-frequency analog anti-aliasing filter.

17. The system of claim 9 further comprising:

a main circuit board for mounting the main conditioning circuit and the main transformer and being electrically connected to the system;

an optional circuit board for mounting the optional conditioning circuit and the optional transformer;

plug means for selectively connecting and disconnecting the optional circuit board to and from the system.

18. A multichannel data collector and analyzer system capable of receiving and analyzing signals from transducers including vibration transducers comprising:

multichannel conditioning circuitry for receiving and conditioning the analog vibration signals from the transducers to produce conditioned analog signals, and having:

(a) filters for producing the conditioned analog signals having desired frequency ranges;

(b) an amplifier for operating on an analog signal at a desired gain for producing a conditioned analog signal at a desired amplitude;

(c) analog to digital converter means for receiving and sampling the conditioned analog signals to produce digital signals;

first and second digital signal processors (DSPs) connected to receive the digital signals for independently and simultaneously operating on the digital signals and analyzing the digital signals to produce digital data based on the digital signals, and memory interfaced with the data processor for storing the digital data.

19. The system of claim 18 wherein said analog to digital converter means further comprise:

a first ADC for receiving and sampling a conditioned analog signal at a relatively high sample rate to produce a first digital signal;

a second ADC for receiving and sampling a conditioned analog signal at a relatively low sample rate to produce a second digital signal; and said data processor selectively receiving at least one of said first and second digital signals.

20. A hand held vibration monitoring system for collecting, analyzing, and storing vibration data, comprising:

transducer means for sensing vibration and for producing at least one analog vibration signal corresponding to the vibration; conditioning circuit means:

(a) for receiving and conditioning the analog vibration signal from the vibration transducer to produce at least one conditioned analog signal;

(b) including at least one amplifier and at least one anti-aliasing filter having an upper cutoff frequency set at a desired frequency for operating on the analog vibration signal and for producing at least one conditioned analog signal having a desired frequency content;

(c) including a first analog to digital converter (ADC) for receiving and sampling at least one conditioned analog signal at a relatively high sample rate to produce a first digital signal; and (d) a second ADC for receiving and sampling at least one conditioned analog signal at a relatively low sample rate to produce a second digital signal;

a data processor for receiving and digitally processing the first and second digital signals to produce desired digital data and for storing data based on the desired digital data;

a user input interfaced with said data processor for inputting commands and data to said data processor;

a display interfaced with said data processor for displaying information to the user; memory interfaced with the data processor for storing information including the data; and means for transferring information that is stored in said memory to the computer.

21. The system of claim 20 wherein said data processor performs a true zoom operation on at least one of the digital signals to produce a zoom digital signal representative of a related frequency band in at least one of the digital signals.

22. The system of claim 20 wherein said data processor performs a true zoom operation on at least one of the digital signals to produce a zoom frequency spectrum representative of a selected frequency band in at least one of the digital signals.

23. The system of claim 20 wherein said data processor further comprises at least two microprocessors, each microprocessor being connected to receive a digital signal corresponding to the vibration and being configured to operate on the digital signal independently of and simultaneously with operation of the other processor on a digital signal corresponding to vibration.

* * * * *

UNITED STATES PATENT AND TRADEMARK OFFICE
CERTIFICATE OF CORRECTION

PATENT NO.    : 5,870,699
DATED         : February 9, 1999
INVENTOR(S)   : Canada et al.

It is certified that error appears in the above-identified patent and that said Letters Patent is hereby corrected as shown below:

Column 17,
Line 14, replace "$(z)=X(z)+(1-Z^{-1})^{-n}Q^{n}(Z)$" with -- $Y(z)=X(z)+(1-z^{-1})^{n}Q^{n}(z)$ --

Signed and Sealed this

Twenty-third Day of July, 2002

Attest:

JAMES E. ROGAN
Attesting Officer          Director of the United States Patent and Trademark Office

(12) EX PARTE REEXAMINATION CERTIFICATE (8040th)
United States Patent
Canada et al.

(10) Number: US 5,870,699 C1
(45) Certificate Issued: Feb. 22, 2011

(54) HAND HELD DATA COLLECTOR AND ANALYZER SYSTEM

(75) Inventors: Ronald G. Canada, Knoxville, TN (US); Danny Simpson, Knoxville, TN (US); Zbigniew Czyzewski, Knoxville, TN (US); Thomas E. Nelson, Knoxville, TN (US)

(73) Assignee: Computational Systems, Inc., Knoxville, TN (US)

Reexamination Request:
No. 90/009,650, Dec. 8, 2009

Reexamination Certificate for:
Patent No.: 5,870,699
Issued: Feb. 9, 1999
Appl. No.: 08/810,132
Filed: Feb. 25, 1997

Certificate of Correction issued Jul. 23, 2002.

Related U.S. Application Data

(63) Continuation of application No. 08/355,208, filed on Dec. 9, 1994, now Pat. No. 5,633,811.

(51) Int. Cl.
*G01H 1/14* (2006.01)
*G01H 1/00* (2006.01)

(52) U.S. Cl. .................. 702/190; 702/113; 702/187; 702/189

(58) Field of Classification Search ............ None
See application file for complete search history.

(56) References Cited

U.S. PATENT DOCUMENTS

| | | |
|---|---|---|
| 3,192,371 A | 6/1965 | Brahm |
| 4,520,674 A | 6/1985 | Canada et al. |
| 5,027,306 A | 6/1991 | Dattorro et al. |
| 5,198,817 A | 3/1993 | Walden et al. |
| 5,233,546 A | 8/1993 | Witte |
| 5,274,374 A | 12/1993 | Powell et al. |
| 5,633,811 A | 5/1997 | Canada et al. |
| 5,663,894 A | 9/1997 | Seth et al. |
| 5,680,025 A | 10/1997 | Bowers, III et al. |
| 5,696,885 A | 12/1997 | Hekmatpour |
| 5,710,723 A | 1/1998 | Hoth et al. |
| 6,192,325 B1 | 2/2001 | Piety et al. |

OTHER PUBLICATIONS

Hewlett–Packard Journal, Dec. 1984, vol. 35, No. 12, Copyright © 1984, Hewlett–Packard Company.
Park, Sangil, PhD., "Principles of Sigma–Delta Modulation for Analog–to–Digital Converters", APR8/D, Rev.1, Motorola Digital Signal Processors, Copyright © Apr. 1993, Motorola, Inc.
Tranter, Jason, "Operating and Using ExpertAlert for Voyager—Version 2.045," Jan. 1999, 407 pages.
Hewlett–Packard, "Data Sheet—HP 3561A Signal Analyzer", circa 1983, 3 pages.
Hewlett–Packard, "Service Manual—HP 3561A Dynamic Signal Analyzer—vol. 1," Feb. 1984, 324 pages.
Hewlett–Packard, "Service Manual—HP 3561A Dynamic Signal Analyzer—vol. 2," Feb. 1984, 272 pages.
Hewlett–Packard, "Effective Machinery Measurements using Dynamic Signal Analyzers," Dec. 1997, 88 pages.
Hewlett–Packard, "The Fundamentals of Signal Analysis," Jan. 1995, 68 pages.

(Continued)

*Primary Examiner*—Linh M. Nguyen

(57) ABSTRACT

A hand held data collector and analyzer achieves superior stability, accuracy and reliability through the use of a fixed frequency anti-aliasing filter and two analog to digital converters, one for high frequency signals and one for low frequency signals. Efficient digital filtering and decimation is achieved by providing specialized hardware filters and decimators and implementing software filters and decimators in a data processor. A true zoom method is employed to take advantage of the filtering and decimation capabilities, and independent digital signal processors operate serially on incoming signals to further reduce demands on the central processing unit. In addition, the RAM system memory is formatted as a pseudo-card to facilitate use of a PCMCIA memory card or the RAM system memory.

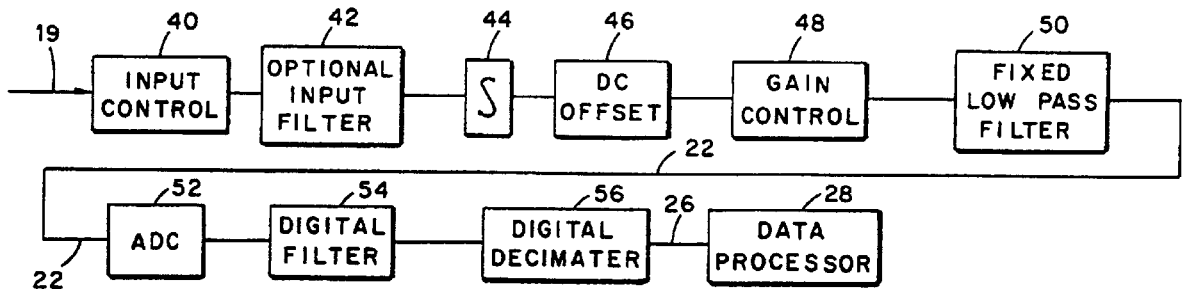

OTHER PUBLICATIONS

Hewlett–Packard, "Hewlett–Packard Journal—vol. 35—No. 12," Dec. 1984, 38 pages.

Motorola, "Technical Data—DSP56ADC16," circa 1989, 28 pages.

Motorola, "Technical Data—DSP56ADC16," Dec. 7, 1992, 26 pages.

Cheval, Eric for Motorola, "Application Note—Logarithmic/Linear Conversion Routines for DSP56000/1," Feb. 1990, 44 pages.

Motorola, "Engineering Bulletin—Converting DSP56001–Based Designs to the DSP56002," circa 1995, 25 pages.

Motorola, "Technical Data—DSP56001 Rev. 3," May 4, 1998, 65 pages.

Motorola, "Technical Data—DSP56002," circa 1996, 11 pages.

Park, Sangil for Motorola, "Motorola Digital Signal Processors—Principles of Sigma–Delta Modulation for Analog–to–Digital Converters," Apr. 1993, 71 pages.

Wowk, Victor, "Machinery Vibration—Measurement and Analysis," McGraw–Hill, 1991, 367 pages.

Den Hartog, J.P., "Mechanical Vibrations—$4^{th}$ Edition," Dover Publications, Inc., Jul. 1984, 465 pages.

Goldman, Steve, "Vibration Spectrum Analysis—A Practical Approach," Industrial Press Inc., 1991, 237 pages.

Vibrotek, Inc., "Dream® for Windows Application Software—Versions 3.0, 3.1, 3.3—User's Manual," circa 2005, 185 pages.

Vibrotek, Inc., "Products—Dream For Windows," http://www.vibrotek.com/dream_win.php, accessed May 20, 2009, 13 pages.

Vibrotek, Inc., "Vibration Monitoring Condition Diagnostics—Dream," circa 2004, 4 pages.

Tranter, Jason, "Operating and Using ExpertAlert for Voyager—Version 1.0," Jan. 1998, 285 pages.

Hamilton, Keith for Diagnostic Instruments, "DI–550/DI–1100/Emonitor dataline/D1–225–D file Format Specification," May 17, 2009, 14 pages.

Diagnostic Instruments, "DI–1100 and DI–225–D Data Collector Communication Programming Guide—Issue 1.02," Feb. 2003, 21 pages.

Diagnostic Instruments, "DI–225–D Measurement Functional Parameters," Dec. 4, 2000, 8 pages.

Diagnostic Instruments, "DI–1100 and DI–225–D Data Collector Communication Protocols—Issue 2.02," May 2003, 92 pages.

Diagnostic Instruments, Source Code, circa 1998, 94 pages.

Fowlie, Jim for Diagnostic Instruments, "Accelerometer List and Spreadsheet," Nov. 27, 1998, 2 pages.

Diagnostic Instruments, "Optimising the operating life of the BP4 Battery—Issue 1," Jan. 1999, 3 pages.

Diagnostic Instruments, "Optimising the operating life of the BP5 Battery—Issue 1–1," Feb. 1999, 5 pages.

Diagnostic Instruments, "BP–4 & BP–5 Battery Management Guide," Jan. 1999, 6 pages.

Diagnostic Instruments, "BP–4 Battery Replacement Procedure," circa Jan. 1999, 1 page.

Howieson, Donald D. for Diagnostic Instruments, "Technical Support Note—BP–4 & ICU–1," Jan. 1999, 5 pages.

Howieson, Donald D. for Diagnostic Instruments, "Technical Support Note—BP–5 & ICU–2," Jan. 1999, 5 pages.

Fowlie, Jim for Diagnostic Instruments, "DI–1100 Hardware Block Diagram," Apr. 11, 1998, 3 pages.

Fowlie, Jim for Diagnostic Instruments, "DI–1100 Hardware Block Diagram," Oct. 24, 1998, 4 pages.

Fowlie, Jim for Diagnostic Instruments, "Build History," Feb. 19, 1999, 2 pages.

Gilmartin, Mike for Diagnostic Instruments, "Diagnostic Instruments Limited Year 2000 Compliance," 5 pages.

Diagnostic Instruments, "DI–1100—Operator's Guide," circa 1997, 95 pages.

Diagnostic Instruments, "DI–1100 IS—Operator's Guide," circa 1997, 31 pages.

Howieson, Donald D. for Diagnostic Instruments, "DI–1100 Key Features, Functions & Benefits," Dec. 14, 1998, 11 pages.

Howieson, Donald D. for Diagnostic Instruments, "Introduction to Diagnostic Instruments" Jan. 11, 1999, 14 pages.

Howieson, Donald D. for Diagnostic Instruments, "DI Service Contracts," Dec. 14, 1998, 7 pages.

Howieson, Donald D. for Diagnostic Instruments, "Overview Presentation of Diagnostic Instruments' Condition Monitoring Products Division," May 11, 1998, 67 pages.

Diagnostic Instruments, "DI–1100 DSP—Press Release / Newsbrief / Manual Changes," circa 1998, 2 pages.

Diagnostic Instruments, "IP Ratings," circa 1998, 2 pages.

Fowlie, Jim for Diagnostic Instruments, "Who has a requirement for Intrinisically Safe (IS) Equipment," Dec. 14, 1998, 16 pages.

Fowlie, Jim for Diagnostic Instruments, "IS Group Differences: Differences between DI–1100–IS–G1 and DI–1100–IS–G2," Oct. 27, 1998, 1 page.

Diagnostics Instruments, "Balancing Application Manual—DI–1100 DI–Card: Operator's Guide—Issue 1.0," circa 1997, 29 pages.

Houldsworth, John for Diagnostic Instruments, "The Basics of Noise," Oct. 17, 1998, 37 pages.

Diagnostics Instruments, Excerpts from "PL302—Machine Analyser—Operating Manual (Analyser Mode)—Operator Reference Section—Revision 1.0," circa 1998, 8 pages.

Hewlett–Packard, "1991: Test & Measurement Catalog—Signal Analyzers," circa 1990, pp. 152–156.

Technology For Energy, "The TEC Model 1330 Smart Meter Plus—Data Sheets," circa 1990, 2 pages.

ENTEK Scientific Corporation, "TEC Model 1330 Smart Meter Plus—Data Sheet," circa 1993, 2 pages.

ENTEK Scientific Corporation, Excerpts from "ENTEK Quickload—B & K Type 2526 Manual—Second Edition," circa 1993, 6 pages.

Brüel & Kjær, "Data Collector—Type 2526—Product Info," circa 1993, 4 pages.

Palomar Technology International, "SD Microlog—Computer–Aided Portable Monitoring System—Data Sheet," circa 1989, 6 pages.

Akhmetov, Daouren and Dote, Yasuhiko, "General Parameter Neural Networks with Fuzzy Self–Organization," Proceedings of the Artifical Neural Networks in Engineering (ANNIE 1996) Conferece, vol. 6, Nov. 10–13, 1996, pp. 191–196.

Lindgaard, Gitte, "Human performance in fault diagnosis: can expert systems help?," Interacting with Computers, vol. 7, No. 3, Sep. 1995—Elsevier Science Ltd B.V, pp. 254–272.

Hall, Gardiner A., Schuetzle, Jaesm, LaVallee, David, and Gupta, Uday, "An Architecture for the Development of Real–Time Fault Diagnosis Systems Using Model–Based Reasoning," Telematics and Informatics, vol. 9, Nos. 3/4, Summer/Fall 1992, Pergamon Press Ltd., pp. 163–172.

Benkhedda, Hassen and Patton, Ron J., "Fault Diagnosis Using Quantitative and Qualitative Knowledge Integration," IEE Conference Publication, No. 427/2, circa 1996, pp. 849–854.

Garga, Amulya, "A Hybrid Implicit/Explicit Automated Reasoning Approach for Condition–Based Maintenance," ASNE Intelligent Ships Symposium II, Nov. 25–26, 1996, pp. 393–405.

Bavishi, Sanjiv and Chong, Edwin K.P., "Automated Fault Diagnosis Using a Discrete Event Systems Framework," IEEE International Symposium on Intelligent Control, Aug. 16–18, 1994, pp. 213–218.

Acosta, G., Alonso, C., Acebes, L., Sanchez, A., and De Prada, C., "Knowledge Based Diagnosis: Dealing with Fault Modes and Temporal Constraints," IECON Proceedings (Industrial Electronics Conference) vol. 2, circa 1994, pp. 1419–1424.

Bernieri, Andrea, Betta, Giovanni, and Liguori, Consolatina, "On–Line Fault Detection and Diagnosis Obtained by Implementing Neural Algorithms on a Digital Signal Processor," IEEE Transactions on Instrumentation and Measurement, vol. 45, No. 5, Oct. 1996, pp. 894–898.

Bazu, Marius, "A Combinted Fuzzy–Logic & Physics–of–Failure Approach to Reliability Prediction," IEEE Transactions on Reliability, vol. 44, No. 2, Jun. 1995, p. 237.

Chang, Liung, "Object–Oriented Expert Systems for Fault Diagnosis," Proceedings of the IEEE Conference on Systems, Man and Cybernetics, vol. 5, circa 1993, pp. 102–107.

Dash, P. K. and Rauta, S., "A New Approach to Estimation of Signal Components for Fault Detection," Journal of Institution Electronics and Telecommunications Engineers, vol. 42, No. 1, Jan.–Feb. 1996, pp. 21–26.

Fax from Yun, Jason to Gay, Cathy re: Product Specification—Model: UG–32F01–SEBT5–B, Mar. 17, 1994, 29 pages.

Randall, R.B., "Frequency Analysis—$3^{rd}$ Edition," Sep. 1987, pp. 165–172.

Thompson, Charles D. for Motorola, "A VLSI Sigma Delta A/D Converter for Audio and Signal Processing Applications," circa 1989, pp. 2569–2572.

Pichler, M. and Tranter, Jason, "Computer Based Techniques for Predictive Maintenance of Rotating Machinery," EEC (Electric Energy Conference), Oct. 6–9, 1987, pp. 216–226.

DLI Engineering Corporation, "ExpertAlert—Expert Automated Diagnostic System: Operating Manual," circa 1992, 90 pages.

DLI Engineering Corporation, "Reference Manual—AdvancedAlert™ Predictive Maintenance System—Version 6.18," Jul. 1993, 570 pages.

Analog Devices, "Application Note (AN–283)—Sigma–Delta ADCs and DACs," circa 1991, 16 pages.

Tranter, Jason, "Operating and Using Voyager—Version 1.03," Jun. 1999, 267 pages.

Tranter, Jason, "Operating and Using ExpertAlert for Voyager—Version 2.5," Jun. 2001, 450 pages.

Computational Systems, Inc., "Autostat—Automated Statistical Limits—User's Manual," Jun. 1997, 98 pages.

Technical Associated of Charlotte, Inc., "Installation & Instruction Booklet for BandAID Software," circa 1993, 36 pages.

Hewlett–Packard, "Model 3561A Dynamic Signal Analyzer—Operating Manual," circa 1983, 212 pages.

Linear Technology, "LTC1293/LTC1294?LTC1296—Single Chip 12–Bit Data Acquisition System Data Sheet," circa 1992, 28 pages.

Computational Systems, Inc., "Machine Component and Configuration Handbook—Guide to Configuring Machines and Components for Nspectr," circa 1997, 251 pages.

Computational Systems, Inc., "MasterTrend for Windows—User's Manual," Mar. 1997, 400 pages.

Computational Systems, Inc., "Model 2115—Machinery Analyzer—User's Manual" circa 1993, 196 pages.

Clarke, et al., "Low–Distortion Mixer: +24 dBm $3^{rd}$–Order Intercept for Only –10 dBm LO Power," Analog Dialog, vol. 28, No. 2, pp. 1–32 (1994).

Berkhout, et al., "Digital Audio Systems," IEEE ASSP Magazine, A Publication of the IEEE Aoucstics, Speech, and Signal Processing Society, vol. 2, No. 4, Special Issue on Digital Audio, pp. 45–67 (Oct. 1985).

Boser, et al., "The Design of Sigma–Delta Modulation Analog–to–Digital Converters," IEEE J. of Solid–State Circuits, vol. 23, No. 6, pp. 1298–1308 (Dec. 1988).

Candy, et al., "The Structure of Quantization Noise from Sigma–Delta Modulation," IEEE Transactions on Communications, vol. COM–29, No. 9, pp. 1316–1323 (Sep. 1981).

Chao, et al., "Higher Order Topology for Interpolative Modulators for Oversampling A/D Converters," IEEE Transactions on Circuits and Systems, vol. 37, No. 3, pp. 309–318 (Mar. 1990).

Crystal Semiconductor Corp. Data Sheet "CS5326 16–bit, Stereo A/D Converter for Digital Audio," DS35PP1 (Oct. 1988).

Dijkstra, et al, "Wave Digital Decimation Filters in Oversampled A/D Converters," 1988 IEEE International Symposium on Circuits and Systems Proceedings, vol. 3, pp. 2327–2330 (Jun. 1988).

Ferguson, et al., "One Bit Higher Order Sigma–Delta A/D Converters," ISCAS. PROC. 1990, vol. 2, pp. 890–893 (1990).

Friedman, "Oversampled Data Conversion Techniques," IEEE Circuits and Devices Magazine, vol. 6, No. 6, pp. 39–45 (Nov. 1990).

Friedman, et al., "A Bit–Slice Architecture for Sigma–Delta Analog–to–Digital Converters," IEEE J. on Selected Areas in Communications, vol. 6, No. 3, pp. 520–526 (Apr. 1988).

Hauser, et al., "Circuit and Technology Considerations for MOS Delta–Sigma A/D Converters," 1986 IEEE, pp. 1310–1315 (May 1986).

Hauser, et al., "WAM 7.5: MOS ADC–Filter Combination That Does Not Require Precision Analog Components," 1985 IEEE ISSC Conference, pp. 80–81, 313 (Feb. 1985).

Hauser, et al., "Monolithic Decimation filtering for Custom Delta–Sigma A/D Converters," ICASSP: 88, vol. IV, VLSI Spectral Estimation, 1988 International Conference on Acoustics, Speech, and Signal Processing, pp. 2005–2008 (Apr. 1988).

Inose, et al., "A Telemetering System by Code Modulation—Δ–Σ Modulation," IRE Transactions on Space Electronics and Telemetry, vol. SET–8, No. 3, pp. 204–209 (Sep. 1962).

Kester, "Which ADC Architecture is Right for Your Application?," *Analog Dialogue 39–06*, pp. 1–8 (Jun. 2005).

Kester, "ADC Architectures III: Sigma–Delta ADC Basics," Analog Devices MT–022 Tutorial, Rev. A, pp. 1–12, (Oct. 2008).

Kester, "ADC Architectures IV: Sigma–Delta ADC Advanced Concepts and Applications," Analog Devices MT–023 Tutorial, Rev. A, pp. 1–11 (Oct. 2008).

Koch, "A 12–Bit Sigma–Delta Analog–to–Digital Converter with a 15–MHz Clock Rate," *IEEE J. of Solid–State Circuits*, vol. SC–21, No. 6, pp. 1003–1010 (Dec. 1986).

Lindell, et al., "CMOS Multichannel Sensor Interface Circuit Using Oversampled Sigma–Delta A–to–D Conversion," *IEEE COMP EURO 89 Proceedings*, VLSI and Computer Peripherals, Hamburg, Germany, pp. 3–126–3–128 (May 1989).

Lipshiz, et al., "Why 1–Bit Sigma–Delta Conversion is Unsuitable for High–Quality Applications," Audio Engineering Society Convention Paper 5395, pp. 1–11, Amsterdam, The Netherlands (May 2001).

Lipshiz, et al., "Why Professional 1–Bit Sigma–Delta Conversion is a Bad Idea," Audio Engineering Society Preprint Presented at the $109^{th}$ Convention in Los Angeles, California, pp. 1–11 (Sep. 2000).

Motorola Semiconductor Technical Data, Advance Information DSP56ADC16, "16–Bit Sigma–Delta Analog–to–Digital Converter," pp. 1–27 (1989).

Norsworthy, et al. "A 13–Bit, 160 kHz Sigma–Delta A/D Converter for ISDN," *IEEE 1988 Custom Integrated Circuits Conference Proceedings*, Rochester, New York, pp. 21.3.1–21.3.4 (May 1988).

Norsworthy, et al., "A 14–Bit 80–kHz Sigma–Delta A/D Converter: Modeling, Design, and Performance Evaluation," *IEEE J. of Solid–State Circuits*, vol. 24, No. 2, pp. 256–266 (Apr. 1989).

Ritoniemi, et al., "Fully Differential CMOS Sigma–Delta Modulator for High Performance Analog–to–Digital Conversion with 5 V Operating Voltage," *1988 IEEE International Symposium on Circuits and Systems Proceedings*, vol. 3, pp. 2321–2326, Helsinki University of Technology, Espoo, Finland (Jun. 1988).

Van de Plassche, "A Sigma–Delta Modulator as an A/D Converter," *IEEE Transactions on Circuits and Sysetms*, vol. CAS–25, No. 7, pp. 510–514 (Jul. 1978).

"The Microlog Collector Model 6200," User Manual, Palomar Technology International, index and pp. 2–1–5–4 and appendix (1990).

Berry, "Proven Method for Specifying Both 6 Spectral Alarm Bands As Well As Narrowband Alarm Envelopes Using Today's Predictive Maintenance Software Systems ($3^{rd}$ Edition)," Technical Associates of Charlotte, Inc., North Carolina, pp. 7–1–70–56 (1993).

Brochure from SKF USA, Inc., "Trouble Free Operation Through Condition Monitoring," pp. 1–16 (1991).

Condition Monitoring Catalog from SKF USA, Inc., table of contents, pp. A–1–E–4, glossary and index (1991).

Machinery Health Management Business History brochure, Emerson Process Management, pp. 1–8 (2009).

Diagnostic Instruments DI–1100 Operator's Guide Issue 2.2, table of contents, pp. R1, table of contents, 1–1–9–7, appendices A–1–D2 and index, Diagnostic Instruments Limited, 2 Michaelson Square, Kirkton Campus, Livingston, UK EH54 7DP (Mar. 1995).

Diagnostic Instruments DI–650 Operator's Guide Issue 1, pp. R1, table of contents, 1–1–7–10, appendices A1–C2 and index, Diagnostic Instruments Limited, 2 Michaelson Square, Kirkton Campus, Livingston, UK EH54 7DP (Aug. 1997).

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 8 is confirmed.

New claims 24-30 are added and determined to be patentable.

Claims 1-7 and 9-23 were not reexamined.

*24. The data collector and analyzer system of claim 8 wherein the filter for producing the conditioned analog signal is a fixed frequency analog anti-aliasing filter and wherein the system comprises a housing dimensioned and configured for being hand held, the conditioning circuit, the data processor and the memory being mounted within the housing, so that the data collector and analyzer system can collect, analyze and store vibration data produced by and collected from a predetermined series of machines.*

*25. The data collector and analyzer system of claim 24 wherein the sigma-delta modulator oversamples the conditioned analog signal.*

*26. The data collector and analyzer system of claim 24 wherein the sigma-delta modulator samples the conditioned analog signal at an initial rate that is multiple times greater than the sampling frequency required by the Nyquist theorem for the highest frequency capable of being analyzed by the system.*

*27. The data collector and analyzer system of claim 24 comprising a second stage of digital low-pass filtering and digital Decimation for optionally reducing the sample rate and frequency content of the digital signal, the second stage being in the data processor.*

*28. The data collector and anlayzer system of claim 24 wherein the sigma-delta modulator is a sigma-delta modulator of at least third order.*

*29. The data collector and analyzer system of claim 24 wherein the digital signal produced by the analog to digital converter has a resolution of at least sixteen bits.*

*30. The data collector and analyzer system of claim 24 wherein the analog to digital converter produces a noise shaped digital signal.*

* * * * *